(12) United States Patent
Divens-Dutcher et al.

(10) Patent No.: US 10,526,249 B2
(45) Date of Patent: *Jan. 7, 2020

(54) CORDIERITE ALUMINUM MAGNESIUM TITANATE COMPOSITIONS AND CERAMIC ARTICLES COMPRISING SAME

(71) Applicant: Corning Incorporated, Corning, NY (US)

(72) Inventors: Adriane Marie Divens-Dutcher, Painted Post, NY (US); Patrick David Tepesch, Corning, NY (US); Elizabeth Marie Vileno, Corning, NY (US)

(73) Assignee: Corning Incorporated, Corning, NY (US)

( * ) Notice: Subject to any disclaimer, the term of this patent is extended or adjusted under 35 U.S.C. 154(b) by 726 days.

This patent is subject to a terminal disclaimer.

(21) Appl. No.: 14/722,560

(22) Filed: May 27, 2015

(65) Prior Publication Data

US 2016/0347665 A1 Dec. 1, 2016

Related U.S. Application Data

(62) Division of application No. 13/690,096, filed on Nov. 30, 2012, now Pat. No. 9,079,799.

(51) Int. Cl.
*C04B 35/478* (2006.01)
*C04B 38/00* (2006.01)
(Continued)

(52) U.S. Cl.
CPC ........... *C04B 35/478* (2013.01); *C04B 38/00* (2013.01); *C04B 38/0006* (2013.01); *C04B 2111/0081* (2013.01); *C04B 2111/00793* (2013.01); *C04B 2235/3206* (2013.01); *C04B 2235/3208* (2013.01); *C04B 2235/3213* (2013.01); *C04B 2235/3225* (2013.01); *C04B 2235/3227* (2013.01); *C04B 2235/3229* (2013.01); *C04B 2235/349* (2013.01);
(Continued)

(58) Field of Classification Search
CPC .......... C04B 35/748; C04B 2235/3206; C04B 2235/3208; C04B 2235/3213; C04B 2235/3225
See application file for complete search history.

(56) References Cited

U.S. PATENT DOCUMENTS 2,920,971 A  1/1960  Stookey
3,531,307 A  9/1970  Rubin
(Continued)

FOREIGN PATENT DOCUMENTS

CN  1277173  12/2000
JP  53101339  9/1978
(Continued)

OTHER PUBLICATIONS

European Office Action, dated Jul. 17, 2015, pp. 1-9, European Application No. 13801962.5, European Patent Office, Munich Germany.
(Continued)

*Primary Examiner* — Amber R Orlando

(57) ABSTRACT

Disclosed are ceramic bodies comprised of composite cordierite aluminum magnesium titanate ceramic compositions and methods for the manufacture of same.

4 Claims, 9 Drawing Sheets

(51) Int. Cl.
*C04B 38/06* (2006.01)
*C04B 111/00* (2006.01)

(52) U.S. Cl.
CPC ............... *C04B 2235/3418* (2013.01); *C04B 2235/6021* (2013.01); *C04B 2235/6567* (2013.01); *C04B 2235/661* (2013.01); *C04B 2235/80* (2013.01); *C04B 2235/9607* (2013.01); *C04B 2235/9615* (2013.01)

(56) References Cited

U.S. PATENT DOCUMENTS

| | | | | |
|---|---|---|---|---|
| 3,770,401 | A * | 11/1973 | Sheets, Jr. | B24D 3/14 51/308 |
| 4,118,240 | A | 10/1978 | Takabatake | |
| 4,289,447 | A * | 9/1981 | Sterman | F01D 11/125 264/642 |
| 4,304,603 | A | 12/1981 | Grossman | |
| 4,307,198 | A * | 12/1981 | Oda | C04B 35/478 264/314 |
| 4,316,965 | A * | 2/1982 | Oda | C04B 35/478 501/112 |
| 4,327,188 | A | 4/1982 | Endo | |
| 4,329,162 | A | 5/1982 | Pitcher, Jr. | |
| 4,483,944 | A * | 11/1984 | Day | B01J 21/12 428/116 |
| 4,598,054 | A | 7/1986 | Mochida et al. | |
| 4,767,731 | A | 8/1988 | Asami | |
| 4,855,265 | A | 8/1989 | Day | |
| 4,900,703 | A | 2/1990 | Ono | |
| 4,987,104 | A * | 1/1991 | Trigg | C04B 35/584 501/92 |
| 5,139,979 | A | 8/1992 | Anderson et al. | |
| 5,153,153 | A | 10/1992 | Freudenberg | |
| 5,290,739 | A | 3/1994 | Hickman | |
| 5,346,870 | A | 9/1994 | Noguchi et al. | |
| 5,491,116 | A | 2/1996 | Beall et al. | |
| 5,536,686 | A * | 7/1996 | Chung | B22D 19/14 106/690 |
| 6,210,645 | B1 | 4/2001 | Kumazawa et al. | |
| 6,403,019 | B1 | 6/2002 | Fukuda et al. | |
| 6,849,181 | B2 | 2/2005 | Ogunwumi et al. | |
| 7,011,788 | B2 | 3/2006 | Fukuda et al. | |
| 7,148,168 | B2 | 12/2006 | Fukuda et al. | |
| 7,166,552 | B2 | 1/2007 | Fukuda et al. | |
| 7,294,164 | B2 | 11/2007 | Merkel | |
| 7,427,309 | B2 * | 9/2008 | Ohno | B01D 39/2075 264/628 |
| 8,557,216 | B2 | 10/2013 | Fukuda et al. | |
| 8,673,045 | B2 | 3/2014 | Merkel | |
| 8,956,436 | B2 * | 2/2015 | Divens-Dutcher | C04B 35/44 422/169 |
| 8,974,724 | B2 | 3/2015 | Day et al. | |
| 2002/0081255 | A1 | 6/2002 | Cutler et al. | |
| 2004/0092381 | A1 | 5/2004 | Beall et al. | |
| 2005/0037147 | A1* | 2/2005 | Ogunwumi | B01J 35/04 427/393.6 |
| 2005/0143255 | A1* | 6/2005 | Morimoto | B01D 39/2093 502/178 |
| 2006/0009347 | A1* | 1/2006 | Fukuda | C04B 35/465 501/136 |
| 2006/0021308 | A1 | 2/2006 | Merkel | |
| 2006/0021309 | A1 | 2/2006 | Merkel | |
| 2006/0068159 | A1* | 3/2006 | Komori | B01J 35/04 428/116 |
| 2006/0239880 | A1 | 10/2006 | Fukuda et al. | |
| 2007/0059484 | A1 | 3/2007 | Fukuda et al. | |
| 2007/0119135 | A1* | 5/2007 | Miao | B01D 39/2068 55/523 |
| 2007/0163219 | A1 | 7/2007 | Fukuda et al. | |
| 2007/0169453 | A1* | 7/2007 | Hayakawa | B01D 46/2459 55/523 |
| 2007/0178275 | A1* | 8/2007 | Takahashi | B01D 46/2418 428/116 |
| 2007/0224110 | A1 | 9/2007 | Fukuda et al. | |
| 2007/0261378 | A1 | 11/2007 | Miao et al. | |
| 2007/0281850 | A1 | 12/2007 | Beall | |
| 2008/0203627 | A1* | 8/2008 | Ogunwumi | C04B 35/478 264/638 |
| 2008/0248238 | A1* | 10/2008 | Tomita | B01D 46/0001 428/116 |
| 2008/0300127 | A1 | 12/2008 | Tennent | |
| 2009/0041975 | A1* | 2/2009 | Kodama | C04B 14/327 428/116 |
| 2009/0057939 | A1* | 3/2009 | Henry | C04B 35/185 264/43 |
| 2009/0176043 | A1* | 7/2009 | Tomita | C04B 35/565 428/34.4 |
| 2010/0237007 | A1 | 9/2010 | Merkel | |
| 2010/0247851 | A1* | 9/2010 | Miyata | B01J 35/04 428/116 |
| 2010/0252497 | A1* | 10/2010 | Ellison | C03C 8/02 210/500.1 |
| 2013/0111862 | A1* | 5/2013 | Divens-Dutcher | C04B 35/44 55/523 |
| 2014/0150389 | A1* | 6/2014 | Divens-Dutcher | C04B 35/195 55/523 |
| 2014/0342898 | A1* | 11/2014 | Backhaus-Ricoult | C04B 35/10 501/80 |

FOREIGN PATENT DOCUMENTS

| | | |
|---|---|---|
| JP | 57003767 | 1/1982 |
| JP | 60141668 | 7/1985 |
| JP | 01167282 | 6/1989 |
| JP | 1995185712 | 7/1995 |
| JP | 2002167268 A | 6/2002 |
| JP | 5527871 | 6/2014 |
| WO | 2014085320 A1 | 6/2014 |

OTHER PUBLICATIONS

English Translation of CN201380071634.X Notice of First Office Action dated Aug. 3, 2016; 9 pages; Chinese Patent Office.
Tsetsekou, Athena, "A comparison study of tialite ceramics doped with various oxide materials and tialite-mullite composites: microstructural, thermal and mechanical properties", Journal of the European Ceramic Society, 25 (2005), p. 335-348.
Pavikov, V. N., et al., "Oxide ceramic materials on the basis of compositions with low thermal expansion", Science for Materials in the Frontier of Centuries: Advantages and Challenges, International Conference, Kyiv, Ukraine, Nov. 4-8, 2002 (2002), 2, Abstract.
May 8, 2014 International Search Report issued in counterpart application No. PCT/US2013/071665.
Mineral Web Chime Plug-in, "Pseudobrookite [Fe2TiO5]" http://www.minweb.co.uk/oxides/pseudobrookite.html May 2003.

* cited by examiner

CORDIERITE ALUMINUM MAGNESIUM TITANATE COMPOSITIONS AND CERAMIC ARTICLES COMPRISING SAME

This application is a divisional of and claims the benefit of U.S. patent application Ser. No. 13/690,096, filed Nov. 30, 2012, which is hereby incorporated by reference for all purposes as if fully set forth herein.

BACKGROUND

Field

Exemplary embodiments of the present disclosure relate to ceramic compositions and to composite ceramic compositions comprised of cordierite aluminum magnesium titanate.

Discussion of the Background

Refractory materials with low thermal expansion, and consequently high thermal shock resistance, are used in applications such as catalytic converter substrates and diesel particulate filters where high thermal gradients exist during use. A material for these applications is cordierite due to its low thermal expansion, high melting point, and low cost. In the diesel particulate filter area, it has been recognized that higher heat capacity is desirable for improving durability of filters during regeneration. A material with a high volumetric heat capacity lowers the volume of material necessary to absorb a given amount of heat. Less material volume may reduce pressure drop in the exhaust stream and increase the open volume for ash storage. However, low thermal expansion is still desired. Aluminum titanate is a material that can be made with low thermal expansion and also has higher volumetric heat capacity than cordierite.

Pure aluminum titanate is metastable below about 1250° C. The thermal expansion of AT is low when the grain size is large and microcracks form during cooling after firing. These large grains and microcracks tend to make the material mechanically weak. As a consequence of the microcracks, the thermal expansion curve can have large hysteresis, leading to high values of instantaneous thermal expansion, especially on cooling. The firing temperature of AT-based composites is typically high, usually above 1400° C. Finally, AT has been shown to exhibit high thermal cycling growth which can be exaggerated by the presence of alkali elements.

To slow down the decomposition rate, additives such as mullite, $MgTi_2O_5$, and $Fe_2TiO_5$ may be added to the aluminum titanate. $MgTi_2O_5$ tends to slow the decomposition rate in reducing conditions and only slows the rate in oxidizing conditions at high levels (>10%). $Fe_2TiO_5$ tends to slow the decomposition rate in oxidizing conditions and increase the decomposition rate in reducing conditions.

Second phases such as mullite have been added to AT to increase the strength of the composite body because microcracking generally does not occur between mullite crystals. Mullite also has a fairly high volumetric heat capacity. Other second phases have also been used in AT composites, including alkali and alkaline earth feldspars. However, mullite and alkali feldspars have a higher than optimum thermal expansion.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide composite ceramic compositions comprising cordierite-pseudobrookite.

Exemplary embodiments of the present disclosure also provide a diesel particulate filter comprised of a composite composition of cordierite aluminum magnesium titanate.

Exemplary embodiments of the present disclosure also provide a method for manufacturing a composite cordierite aluminum magnesium titanate ceramic article.

Additional features of the claimed invention will be set forth in the description which follows, and in part will be apparent from the description, or may be learned by practice of the invention as claimed.

An exemplary embodiment discloses a ceramic article comprising a pseudobrookite phase comprising predominately alumina, magnesia, and titania; a second phase comprising cordierite; and a sintering aid, comprising at least one of a calcium oxide and a strontium oxide.

An exemplary embodiment discloses an article comprising a composite composition of a solid solution of aluminum titanate and magnesium dititanate and a second crystalline phase comprising cordierite. The article has a composition, as expressed in weight percent on an oxide basis of from 4 to 10% MgO; from 40 to 55% $Al_2O_3$; from 25 to 44% $TiO_2$; from 5 to 25% $SiO_2$, and a sintering aid, the sintering aid including at least one of a calcium oxide and a strontium oxide.

An exemplary embodiment also discloses a diesel particulate filter comprised of a composite composition of a solid solution of aluminum titanate and magnesium dititanate and a second crystalline phase comprising cordierite. The particulate filter has a composition, as expressed in weight percent on an oxide basis of from 4 to 10% MgO; from 40 to 55% $Al_2O_3$; from 25 to 44% $TiO_2$; from 5 to 25% $SiO_2$, and a sintering aid, the sintering aid including at least one of a calcium oxide and a strontium oxide. In an exemplary embodiment the diesel particulate filter comprises a honeycomb structure having a plurality of axially extending end-plugged inlet and outlet cells.

An exemplary embodiment also discloses a method for manufacturing a composite cordierite aluminum magnesium titanate ceramic article. The method includes compounding an inorganic batch composition comprising a magnesia source, a silica source, an alumina source, a titania source, and at least one sintering aid, wherein the sintering aid includes at least one of a calcium oxide and a strontium oxide. Mixing the inorganic batch composition together with one or more processing aid selected from the group consisting of a plasticizer, lubricant, binder, pore former, and solvent, to form a plasticized ceramic precursor batch composition. Shaping the plasticized ceramic precursor batch composition into a green body. The method includes firing the green body under conditions effective to convert the green body into a ceramic article comprising a first crystalline phase comprised predominantly of a solid solution of aluminum titanate and magnesium dititanate and a second crystalline phase comprising cordierite.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the disclosure and are incorporated in and constitute a part of this specification, illustrate exemplary embodiments of the claimed invention, and together with the description serve to explain the principles of the invention as claimed.

DETAILED DESCRIPTION

Figure 1:
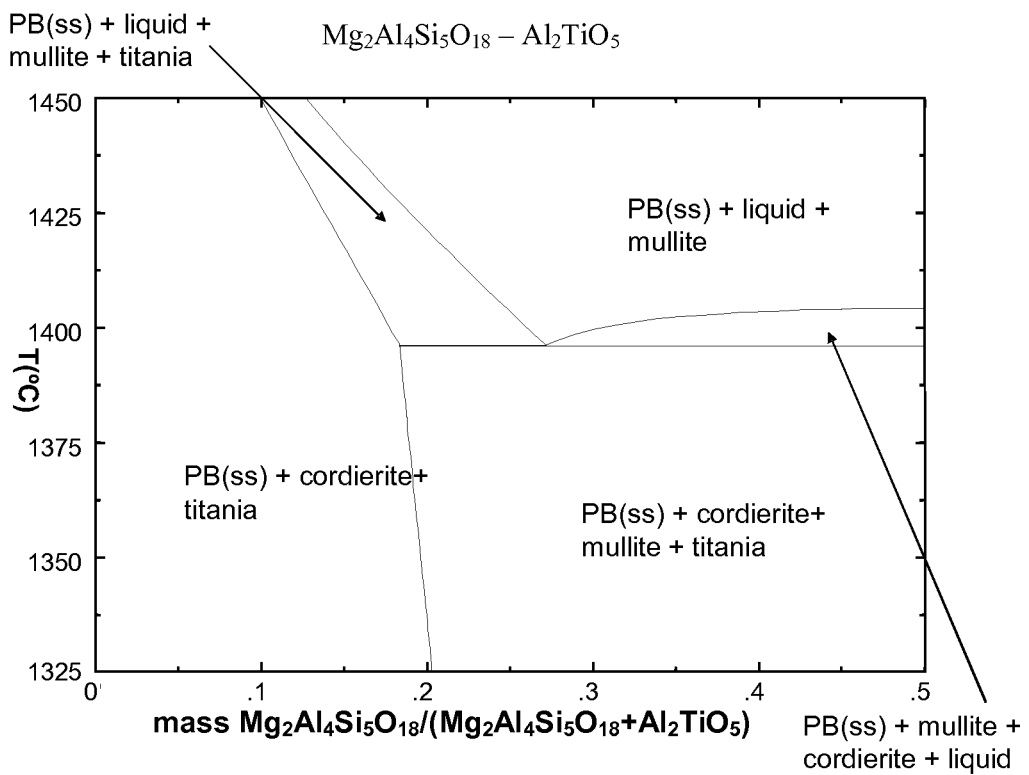
FIG. 1 depicts the approximate stable combination of phases as a function of temperature and composition along the pseudo-binary join between aluminum titanate ($Al_2TiO_5$) and cordierite ($Mg_2Al_4Si_5O_{18}$).

It will be understood that for the purposes of this disclosure, "at least one of X, Y, and Z" can be construed as X only, Y only, Z only, or any combination of two or more items X, Y, and Z (e.g., XYZ, XYY, YZ, ZZ).

In an effort to provide a composite AT ceramic body having improved strength while maintaining a low CTE, cordierite would be a better choice than mullite as a second phase because cordierite has a lower coefficient of thermal expansion than does mullite. However, cordierite and pure aluminum titanate are not in thermodynamic equilibrium at any temperature. The provision of a cordierite and AT based composite ceramic having low CTE, high strength, and good thermal stability represents an advancement in the state of the art.

An exemplary embodiment of the present disclosure provides a composite ceramic body comprising a first crystalline phase comprised predominantly of a solid solution of aluminum titanate and magnesium dititanate ($MgTi_2O_5$—$Al_2TiO_5$) and a second crystalline phase comprising cordierite. The compositions of the ceramic bodies can be characterized as comprising, when expressed on weight percent oxide basis: from 4 to 10% MgO; from 40 to 55% $Al_2O_3$; from 25 to 42% $TiO_2$; from 5 to 25% $SiO_2$; from 0 to 5% $CeO_2$, and at least one of from 0.15 to 1% CaO and from 0.1 to 2% SrO. In these or other exemplary embodiments, the compositions of the ceramic bodies of the disclosure are expressed in terms of weight fractions of oxides and oxide combinations to comprise, on an oxide basis, $a(Al_2TiO_5)+b(MgTi_2O_5)+c(2MgO.2Al_2O_3.5SiO_2)+d(3Al_2O_3.2SiO_2)+e(MgO.Al_2O_3)+f(2MgO.TiO_2)+g(CaO)+h(SrO)+i(X)+j(Fe_2O_3.TiO_2)+k(TiO_2)+l(Al_2O_3)$, wherein X can be at least one of $CeO_2$, $Y_2O_3$, and $La_2O_3$, and a, b, c, d, e, f, g, h, i, j, k, and l are weight fractions of each component such that (a+b+c+d+e+f+g+h+i+j+k+l)=1.00. To that end, the weight fraction of each component can be in the respective ranges as follows: 0.3≤a≤0.75, 0.075≤b≤0.3, 0.02≤c≤0.5, 0.0≤d≤0.4, 0.0≤e≤0.25, 0.0≤f≤0.1, 0.0≤g≤0.01, 0.0≤h≤0.02, 0.0015≤(g+h), 0.0≤i≤0.05, 0.0≤j≤0.05, 0.0≤k≤0.20, and 0.0≤l≤0.10. It will be recognized that the oxides and oxide combinations used to define the oxide compositions of these ceramics will not necessarily be present in the ceramic bodies as the corresponding free oxides or crystal phases, other than as those crystal phases are specifically identified herein as characteristic of these ceramics. It will also be recognized that while the sum of a, b, c, d, e, f, g, h, i, j, k, and l is 1.00, it is the ratio of oxides and oxide combinations that are expressed. That is, the composite ceramic body may include other impurities in addition to the ratio of oxides and oxide combinations expressed. This will be apparent in view of the examples disclosed below.

The solid solution aluminum titanate and magnesium dititanate phase preferably exhibits a pseudobrookite crystal structure. To that end, the composition of the pseudobrookite phase can depend upon the processing temperature as well as the overall bulk composition of the ceramic and, as such, can be determined by an equilibrium condition. However, in an exemplary embodiment, the composition of the pseudobrookite phase comprises from approximately 15% to 35% $MgTi_2O_5$ by weight. Still further, while the total volume of the pseudobrookite phase can also vary, in another exemplary embodiment, the total volume can be in the range of about 50 to 95 volume % of the overall ceramic composition.

Optionally, the composite ceramic body can further comprise one or more phases selected from the group consisting of mullite, sapphirine, a titania polymorph such as rutile or anatase, corundum, and a spinel solid solution ($MgAl_2O_4$-$Mg_2TIO_4$). When present, the composition of the spinel phase will also depend on processing temperatures and overall bulk composition. However, in an exemplary embodiment, the spinel phase can comprise at least about 95% $MgAl_2O_4$.

Still further, the ceramic composition can also comprise one or more sintering aid(s) or additives provided to lower the firing temperature and broaden the firing window required to form the ceramic composition. A sintering aid can, for example, be present in an amount of from 0.15 to 5 weight percent of the total composition and can include, for example, one or more metal oxides such as CaO, SrO, $CeO_2$, $Y_2O_3$, and $La_2O_3$.

In an exemplary embodiment, yttrium oxide ($Y_2O_3$) and/or lanthanum oxide ($La_2O_3$) has been found to be a particularly good sintering additive when added in an amount of between 0.5 and 4.0 wt. %, for example, between 1.0 and 2.0 wt. %. To that end, the yttrium oxide or lanthanide oxide may be present as the oxide phase, or may form a new phase with one or more of the other metal oxide constituents of the ceramic body. Similarly, iron oxide from a suitable iron source, present as ferrous or ferric oxide or in combination with other oxides, e.g., as $Fe_2TiO_5$, can be present in some embodiments in an amount, calculated as $Fe_2TiO_5$, of from 0 to 3 weight % $Fe_2TiO_5$. The presence of $Fe_2TiO_5$ can be useful for slowing decomposition in oxidizing atmospheres. When both $Fe_2TiO_5$ and a spinel phase are present in the ceramic body, the spinel solid solution can also additionally contain ferrous and/or ferric iron in the solid solution.

Furthermore, the sintering aid can include cerium oxide ($CeO_2$) or cerium oxide in combination with one or more other metal oxides such as $Y_2O_3$, and $La_2O_3$. For example, the sintering aid can include cerium oxide in combination with yttrium oxide, cerium oxide in combination with lanthanum oxide, or cerium oxide in combination with yttrium oxide and lanthanum oxide.

In U.S. patent application Ser. No. 12/305,767, the entire contents of which are herein incorporated by reference, cordierite, mullite, pseudobrookite composites with high porosity and low thermal expansion are described having a wide firing window when yttrium oxide is added to the batch. The present application recognizes a need for a wide firing window while avoiding the high cost of yttrium oxide and other rare earth elements.

According to an exemplary embodiment of the present disclosure the sintering aid can include calcium oxide (CaO), strontium oxide (SrO), calcium oxide in combination with strontium oxide, calcium oxide in combination with one or more other metal oxides such as cerium oxide, yttrium oxide ($Y_2O_3$), and lanthanum oxide ($La_2O_3$), strontium oxide in combination with one or more other metal oxides such as cerium oxide, $Y_2O_3$, and $La_2O_3$, or calcium oxide and strontium oxide in combination with one or more other metal oxides such as cerium oxide, $Y_2O_3$, and $La_2O_3$. For example, the sintering aid can include calcium oxide, calcium oxide in combination with yttrium oxide, calcium oxide in combination with lanthanum oxide, calcium oxide in combination with cerium oxide, calcium oxide in combination with yttrium oxide and lanthanum oxide, calcium oxide in combination with yttrium oxide and cerium oxide, calcium oxide in combination with cerium oxide and lanthanum oxide, or calcium oxide in combination with yttrium oxide, lanthanum oxide, and cerium oxide. For example, the sintering aid can include strontium oxide, strontium oxide in combination with yttrium oxide, strontium oxide in combination with lanthanum oxide, strontium oxide in combination with cerium oxide, strontium oxide in combination with yttrium oxide and lanthanum oxide, strontium oxide in combination with yttrium oxide and cerium oxide, strontium oxide in combination with cerium oxide and lanthanum oxide, or strontium oxide in combination with yttrium oxide, lanthanum oxide, and cerium oxide. For example, the sintering aid can include calcium oxide and strontium oxide, calcium oxide and strontium oxide in combination with yttrium oxide, calcium oxide and strontium oxide in combination with lanthanum oxide, calcium oxide and strontium oxide in combination with cerium oxide, calcium oxide and strontium oxide in combination with yttrium oxide and lanthanum oxide, calcium oxide and strontium oxide in combination with yttrium oxide and cerium oxide, calcium oxide and strontium oxide in combination with cerium oxide and lanthanum oxide, or calcium oxide and strontium oxide in combination with yttrium oxide, lanthanum oxide, and cerium oxide. That is, the sintering aid can include, for example, at least one of CaO and SrO in combination with at least one of $Y_2O_3$, $CeO_2$, and $La_2O_3$.

The inventors have found that calcium oxide, strontium oxide, or mixtures of calcium oxide and strontium oxide with one or more other metal oxides such as cerium oxide, $Fe_2TiO_5$, yttrium oxide, and lanthanum oxide, result in similar CTE, porosity, pore size, and pore size distribution at lower rare earth cost than yttrium oxide alone or yttrium oxide with other rare earth elements.

In an exemplary embodiment the amount of calcium oxide can be in a range of about 0.15 to about 1.0 wt % and/or the amount of strontium oxide can be in a range of about 0.1 to about 2.0 wt %. For example, the amount of calcium oxide can be in a range of 0.2 to 0.9 wt %, 0.25 to 0.75 wt %, and 0.4 to 0.6 wt %. For example, the amount of strontium oxide can be in a range of 0.16 to 1.8 wt %, 0.2 to 1.6 wt %, and 0.3 to 1.5 wt %.

As mentioned, in an exemplary embodiment the mixtures of calcium oxide and/or strontium oxide with one or more other metal oxides such as cerium oxide, yttrium oxide, and lanthanum oxide can be a sintering aid. The amount of the mixture can be in a range of 0.15 to 5.0 wt %. For example, the amount of the mixture can be in a range of 0.3 to 3.0 wt %, 0.4 to 2.5 wt %, 0.5 to 1.5 wt %, and 2.5 to 4.5 wt %.

According to an exemplary embodiment of the present disclosure, the ceramic body comprises approximately 10 to 25 wt % cordierite, approximately 5 to 30 wt % mullite, approximately 50 to 70 wt % of a pseudobrookite phase consisting predominantly of an $Al_2TiO_5$—$MgTi_2O_5$ solid solution, and approximately 0.15 to 3.0 wt % of at least one of CaO and SrO addition. According to another exemplary embodiment of the present disclosure, the ceramic body comprises approximately 10 to 25 wt % cordierite, approximately 5 to 30 wt % mullite, approximately 50 to 70 wt % of a pseudobrookite phase consisting predominantly of an $Al_2TiO_5$—$MgTi_2O_5$ solid solution, approximately 0.1 to 3.0 wt % $CeO_2$ addition, and an addition of at least one of CaO at approximately 0.15 to 1.0 wt % and SrO at approximately 0.1 to 2.0 wt %.

Exemplary embodiments of the ceramic bodies of the present disclosure can in some instances comprise a relatively high level of total porosity. For example, bodies comprising a total porosity, % P, of at least 40%, at least 45%, at least 50%, or even at least 60%, as determined by mercury porosimetry, can be provided.

In addition to the relatively high total porosities, ceramic bodies of the present disclosure can also comprise a relatively narrow pore size distribution evidenced by a minimized percentage of relatively fine and/or relatively large pore sizes. To this end, relative pore size distributions can be expressed by a pore fraction which, as used herein, is the percent by volume of porosity, as measured by mercury porosimetry, divided by 100. For example, the quantity $d_{50}$ represents the median pore size based upon pore volume, and is measured in micrometers; thus, $d_{50}$ is the pore diameter at which 50% of the open porosity of the ceramic sample has been intruded by mercury. The quantity $d_{90}$ is the pore diameter at which 90% of the pore volume is comprised of pores whose diameters are smaller than the value of $d_{90}$; thus, $d_{90}$ is also equal to the pore diameter at which 10% by volume of the open porosity of the ceramic has been intruded by mercury. Still further, the quantity $d_{10}$ is the pore diameter at which 10% of the pore volume is comprised of pores whose diameters are smaller than the value of $d_{10}$; thus, $d_{10}$ is equal to the pore diameter at which 90% by volume of the open porosity of the ceramic has been intruded by mercury. The values of $d_{10}$ and $d_{90}$ are also expressed in units of micrometers.

The median pore diameter, $d_{50}$, of the pores present in the instant ceramic articles can, in one embodiment, be at least 10 μm, more preferably at least 14 μm, or still more preferably at least 16 μm. In another embodiment, the median pore diameter, $d_{50}$, of the pores present in the instant ceramic articles do not exceed 30 μm, and more preferably do not exceed 25 μm, and still more preferably do not exceed 20 μm. In still another embodiment, the median pore diameter, $d_{50}$, of the pores present in the instant ceramic articles can be in the range of from 10 μm to 30 μm, more preferably from 18 μm to 25 μm, even more preferably from 14 μm to 25 μm, and still more preferably from 16 μm to 20 μm. To this end, a combination of the aforementioned porosity values and median pore diameter values can provide low clean and soot-loaded pressure drop while maintaining useful filtration efficiency when the ceramic bodies of the present disclosure are used in diesel exhaust filtration applications.

The relatively narrow pore size distribution of the exemplary embodiments of the ceramic articles can, in one embodiment, be evidenced by the width of the distribution of pore sizes finer than the median pore size, $d_{50}$, further quantified as pore fraction. As used herein, the width of the distribution of pore sizes finer than the median pore size, $d_{50}$, are represented by a "$d_{factor}$" or "$d_f$" value which expresses the quantity $(d_{50}-d_{10})/d_{50}$. To this end, the ceramic bodies of the present disclosure can comprise a $d_{factor}$ value that does not exceed 0.50, 0.40, 0.35, or even that does not exceed 0.30. In some exemplary embodiments, the $d_{factor}$ value of the disclosed ceramic body does not exceed 0.25 or even 0.20. To this end, a relatively low $d_f$ value indicates a low fraction of fine pores, and low values of $d_f$ can be beneficial for ensuring low soot-loaded pressure drop when the ceramic bodies are utilized in diesel filtration applications.

The relatively narrow pore size distribution of the disclosed ceramic articles can in another exemplary embodiment also be evidenced by the width of the distribution of pore sizes that are finer or coarser than the median pore size, $d_{50}$, further quantified as a pore fraction. As used herein, the width of the distribution of pore sizes that are finer or coarser than the median pore size, $d_{50}$, are represented by a "$d_{breadth}$" or "$d_B$" value which expresses the quantity $(d_{90}-d_{10})/d_{50}$. To this end, the ceramic structure of the present disclosure in one exemplary embodiment comprises a $d_b$ value that is less than 1.50, less than 1.25, less than 1.10, or even less than 1.00. In some exemplary embodiments, the value of $d_b$ is not more than 0.8, more preferably not greater than 0.7, and even more preferably not greater than 0.6. A relatively low value of $d_b$ can provide a relatively higher filtration efficiency and higher strength for diesel filtration applications.

Another exemplary embodiment of the ceramic bodies exhibit a low coefficient of thermal expansion resulting in excellent thermal shock resistance (TSR). As will be appreciated by one of ordinary skill in the art, TSR is inversely proportional to the coefficient of thermal expansion (CTE). That is, a ceramic body with low thermal expansion will typically have higher thermal shock resistance and can survive the wide temperature fluctuations that are encountered in, for example, diesel exhaust filtration applications. Accordingly, in one exemplary embodiment, the ceramic articles of the present disclosure are characterized by having a relatively low coefficient of thermal expansion (CTE) in at least one direction and as measured by dilatometry, that is less than or equal to about $25.0 \times 10^{-7}/°$ C., less than or equal to $20.0 \times 10^{-7}/°$ C.; less than or equal to $15.0 \times 10^{-7}/°$ C., less than or equal to $10.0 \times 10^{-7}/°$ C., or even less than or equal to $8.0 \times 10^{-7}/°$ C., across the temperature range of from 25° C. to 1000° C.

Still further, it should be understood that exemplary embodiments can exhibit any desired combination of the aforementioned properties. For example, in one embodiment, it is preferred that the CTE (25-1000° C.) does not exceed $12 \times 10^{-7}/°$ C. (and preferably not more than $10 \times 10^{-7}/°$ C.), the porosity % P is at least 45%, the median pore diameter is at least 14 μm (and preferably at least 18 μm), and the value of $d_f$ is not more than 0.35 (and preferably not more than 0.30). It is further preferred that such exemplary ceramic bodies exhibit a value of $d_b$ that does not exceed 1.0, and more preferably that does not exceed 0.85, and still more preferably that does not exceed 0.75. In another exemplary embodiment, the CTE (25-1000° C.) does not exceed $18 \times 10^{-7}/°$ C. and the porosity % P is at least 40%. For example, the CTE (25-1000° C.) does not exceed $18 \times 10^{-7}/°$ C. and the porosity % P is at least 60%. In another example, CTE (25-1000° C.) does not exceed $12 \times 10^{-7}/°$ C. and the porosity % P is at least 40%. In a further example, CTE (25-1000° C.) does not exceed $12 \times 10^{-7}/°$ C. and the porosity % P is at least 60%.

The ceramic bodies of the present disclosure can have any shape or geometry suitable for a particular application. In high temperature filtration applications, such as diesel particulate filtration, for which the ceramic bodies are especially suited, it is preferred the bodies to have a multicellular structure, such as that of a honeycomb monolith. For example, in an exemplary embodiment, the ceramic body can comprise a honeycomb structure having an inlet and outlet end or face, and a multiplicity of cells extending from the inlet end to the outlet end, the cells having porous walls. The honeycomb structure can further have cellular densities from 70 cells/in$^2$ (10.9 cells/cm$^2$) to 400 cells/in$^2$ (62 cells/cm$^2$). A portion of the cells at the inlet end or face end can, in one embodiment, be plugged with a paste having same or similar composition to that of the honeycomb structure, as described in U.S. Pat. No. 4,329,162 which is herein incorporated by reference. The plugging is only at the ends of the cells which is typically to a depth of about 5 to 20 mm, although this can vary. A portion of the cells on the outlet end but not corresponding to those on the inlet end are plugged. Therefore, each cell is plugged only at one end. A preferred arrangement is to have every other cell on a given face plugged as in a checkered pattern.

This plugging configuration allows for more intimate contact between the exhaust stream and the porous wall of the substrate. The exhaust stream flows into the substrate through the open cells at the inlet end, then through the porous cell walls, and out of the structure through the open cells at the outlet end. Filters of the type herein described are known as "wall flow" filters since the flow paths resulting from alternate channel plugging require the exhaust being treated to flow through the porous ceramic cell walls prior to exiting the filter.

Exemplary embodiments of the present disclosure also provide a method of manufacturing composite cordierite aluminum magnesium titanate ceramic articles from a ceramic forming precursor batch composition comprised of certain inorganic powdered raw materials. Generally, the method first comprises providing an inorganic batch composition comprising a magnesia source, a silica source, an alumina source, and a titania source. The inorganic batch composition is then mixed together with one or more processing aid(s) selected from the group consisting of a plasticizer, lubricant, binder, pore former, and solvent, to form a plasticized ceramic precursor batch composition. The plasticized ceramic precursor batch composition can be shaped or otherwise formed into a green body, optionally dried, and subsequently fired under conditions effective to convert the green body into a ceramic article.

The magnesia source can, for example and without limitation, be selected from one or more of MgO, Mg(OH)$_2$, MgCO$_3$, MgAl$_2$O$_4$, Mg$_2$SiO$_4$, MgSiO$_3$, MgTiO$_3$, Mg$_2$TiO$_4$, MgTi$_2$O$_5$, talc, and calcined talc. Alternatively, the magnesia source can be selected from one or more of forsterite, olivine, chlorite, or serpentine. Preferably, the magnesia source has a median particle diameter that does not exceed 35 µm, and preferably that does not exceed 30 µm. To this end, as referred to herein, all particle diameters are measured by a laser diffraction technique such as by a Microtrac particle size analyzer.

The alumina source can, for example and without limitation, be selected from an alumina-forming source such as corundum, $Al(OH)_3$, boehmite, diaspore, a transition alumina such as gamma-alumina or rho-alumina. Alternatively, the alumina source can be a compound of aluminum with another metal oxide such as $MgAl_2O_4$, $Al_2TiO_5$, mullite, kaolin, calcined kaolin, phyrophyllite, kyanite, etc. In one embodiment, the weighted average median particle size of the alumina sources is preferably in the range of from 10 µm to 60 µm, and more preferably in the range of from 15 µm to 30 µm. In still another embodiment, the alumina source can be a combination of one or more alumina forming sources and one or more compounds of aluminum with another metal oxide.

The titania source can, in addition to the compounds with magnesium or alumina described above, be provided as $TiO_2$ powder.

The silica source can be provided as a $SiO_2$ powder such as quartz, cryptocrystalline quartz, fused silica, diatomaceous silica, low-alkali zeolite, or colloidal silica. Additionally, the silica source can also be provided as a compound with magnesium and/or aluminum, including for example, cordierite, chlorite, and the like. In still another embodiment, the median particle diameter of the silica source is preferably at least 5 µm, more preferably at least 10 µm, and still more preferably at least 20 µm.

As described above, one or more sintering aid(s) or additives can optionally be added to the precursor batch composition to lower the firing temperature and broaden the firing window required to form the ceramic composition. The sintering aid can, for example, be present in an amount of from 0.15 to 5 weight percent of the total composition and can include, for example, one or more of a metal oxide such as at least one of CaO and SrO, or at least one of CaO and SrO in combination with one or more of $CeO_2$, $Y_2O_3$, and $La_2O_3$. The sintering aid(s) can be added to the precursor batch composition as carbonates, silicates, aluminates, hydrates, etc. In one exemplary embodiment, calcium oxide (CaO) has been found to be a particularly good sintering additive when added in an amount of between about 0.15 and 1.0 wt %, and more preferably between about 0.25 and 0.75 wt %. In one exemplary embodiment, strontium oxide (SrO) has been found to be a particularly good sintering additive when added in an amount of between about 0.1 and 2.0 wt %, and more preferably between about 0.5 and 1.5 wt %. Similarly, an addition of $Fe_2TiO_5$ can be useful for slowing decomposition in oxidizing atmospheres when added in an amount of from 0 to 3 weight %.

Still further, the ceramic precursor batch composition may comprise other additives such as surfactants, oil lubricants and pore-forming material. Non-limiting examples of surfactants that may be used as forming aids are $C_8$ to $C_{22}$ fatty acids, and/or their derivatives. Additional surfactant components that may be used with these fatty acids are $C_8$ to $C_{22}$ fatty esters, $C_8$ to $C_{22}$ fatty alcohols, and combinations of these. Exemplary surfactants are stearic, lauric, myristic, oleic, linoleic, palmitic acids, and their derivatives, tall oil, stearic acid in combination with ammonium lauryl sulfate, and combinations of all of these. In an illustrative embodiment, the surfactant is lauric acid, stearic acid, oleic acid, tall oil, and combinations of these. In some embodiments, the amount of surfactants is from about 0.25% by weight to about 2% by weight.

Non-limiting examples of oil lubricants used as forming aids include light mineral oil, corn oil, high molecular weight polybutenes, polyol esters, a blend of light mineral oil and wax emulsion, a blend of paraffin wax in corn oil, and combinations of these. In some embodiments, the amount of oil lubricants is from about 1% by weight to about 10% by weight. In an exemplary embodiment, the oil lubricants are present from about 3% by weight to about 6% by weight.

The precursor composition can, if desired, contain a pore-forming agent to tailor the porosity and pore size distribution in the fired body for a particular application. A pore former is a fugitive material which evaporates or undergoes vaporization by combustion during drying or heating of the green body to obtain a desired, usually higher porosity and/or coarser median pore diameter. A suitable pore former can include, without limitation, carbon; graphite; starch; wood, shell, or nut flour; polymers such as polyethylene beads; waxes; and the like. When used, a particulate pore former can have a median particle diameter in the range of from 10 µm to 70 µm, and more preferably from 15 µm to 50 µm.

The inorganic ceramic forming batch components, along with any optional sintering aid and/or pore former, can be intimately blended with a liquid vehicle and forming aids which impart plastic formability and green strength to the raw materials when they are shaped into a body. When forming is done by extrusion, most typically a cellulose ether binder such as methylcellulose, hydroxypropyl methylcellulose, methylcellulose derivatives, and/or any combinations thereof, serve as a temporary organic binder, and sodium stearate can serve as a lubricant. The relative amounts of forming aids can vary depending on factors such as the nature and amounts of raw materials used, etc. For example, the typical amounts of forming aids are about 2% to about 10% by weight of methyl cellulose, and preferably about 3% to about 6% by weight, and about 0.5% to about 1% by weight sodium stearate, stearic acid, oleic acid or tall oil, and preferably about 0.6% by weight. The raw materials and the forming aids are typically mixed together in dry form and then mixed with water as the vehicle. The amount of water can vary from one batch of materials to another and therefore is determined by pre-testing the particular batch for extrudability.

The liquid vehicle component can vary depending on the type of material used in order to impart optimum handling properties and compatibility with the other components in the ceramic batch mixture. Typically, the liquid vehicle content is usually in the range of from 15% to 50% by weight of the plasticized composition. In one embodiment, the liquid vehicle component can comprise water. In another embodiment, depending on the component parts of the ceramic batch composition, it should be understood that organic solvents such as, for example, methanol, ethanol, or a mixture thereof can be used as the liquid vehicle.

Forming or shaping of the green body from the plasticized precursor composition may be done by, for example, typical ceramic fabrication techniques, such as uniaxial or isostatic pressing, extrusion, slip casting, and injection molding. Extrusion is preferred when the ceramic article is of a honeycomb geometry, such as for a catalytic converter flow-through substrate or a diesel particulate wall-flow filter. The resulting green bodies can be optionally dried, and then fired in a gas or electric kiln or by microwave heating, under conditions effective to convert the green body into a ceramic article. For example, the firing conditions effective to convert the green body into a ceramic article can comprise heating the green body at a maximum soak temperature in the range of from 1250° C. to 1450° C., for example, in the range of from 1300° C. to 1350° C., or in the range of from 1330° C. to 1380° C., and maintaining the maximum soak temperature for a hold time sufficient to convert the green body into a ceramic article, followed by cooling at a rate sufficient not to thermally shock the sintered article.

Still further, the effective firing conditions can comprise heating the green body at a first soak temperature in the range of from 1240 to 1350° C. (preferably 1270 to 1330° C.), holding the first soak temperature for a period of from 2 to 10 hours (preferably 4 to 8 hours), then heating the body at a second soak temperature in the range of from 1270 to 1450° C. (preferably 1300-1350° C.), and holding the second soak temperature for a period of from 2 to 10 hours (preferably 4 to 8 hours), again followed by cooling at a rate sufficient not to thermally shock the sintered article.

To obtain a wall-flow filter, a portion of the cells of the honeycomb structure at the inlet end or face are plugged, as known in the art. The plugging is only at the ends of the cells which is typically to a depth of about 1 to 20 mm, although this can vary. A portion of the cells on the outlet end but not corresponding to those on the inlet end are plugged. Therefore, each cell is plugged only at one end. The preferred arrangement is to have every other cell on a given face plugged in a checkered pattern.

A greater understanding of the findings underlying the present disclosure can be obtained with reference to phase equilibrium diagrams for the $MgO$—$Al_2O_3$—$TiO_2$—$SiO_2$ system, prepared by at least one of the present inventors, and set forth in previously mentioned U.S. patent application Ser. No. 12/305,767. It will of course be recognized that many of the boundaries between phase fields included in such diagrams represent the results of equilibrium calculations and extrapolation rather than actual phase analyses. While the phase fields themselves have been confirmed with experiments, the precise temperatures and compositions representing boundaries between phase fields are approximate. In any case, the phase diagram of FIG. 1 depicts the stable combination of phases as a function of temperature and composition along the pseudo-binary join between aluminum titanate ($Al_2TiO_5$) and cordierite ($Mg_2Al_4Si_5O_{18}$). Essentially, this diagram indicates that mixtures of cordierite and AT at high temperature will tend to form other phases, including mullite, titania, liquid, and a solid-solution phase with the pseudobrookite crystal structure.

Figure 2A:
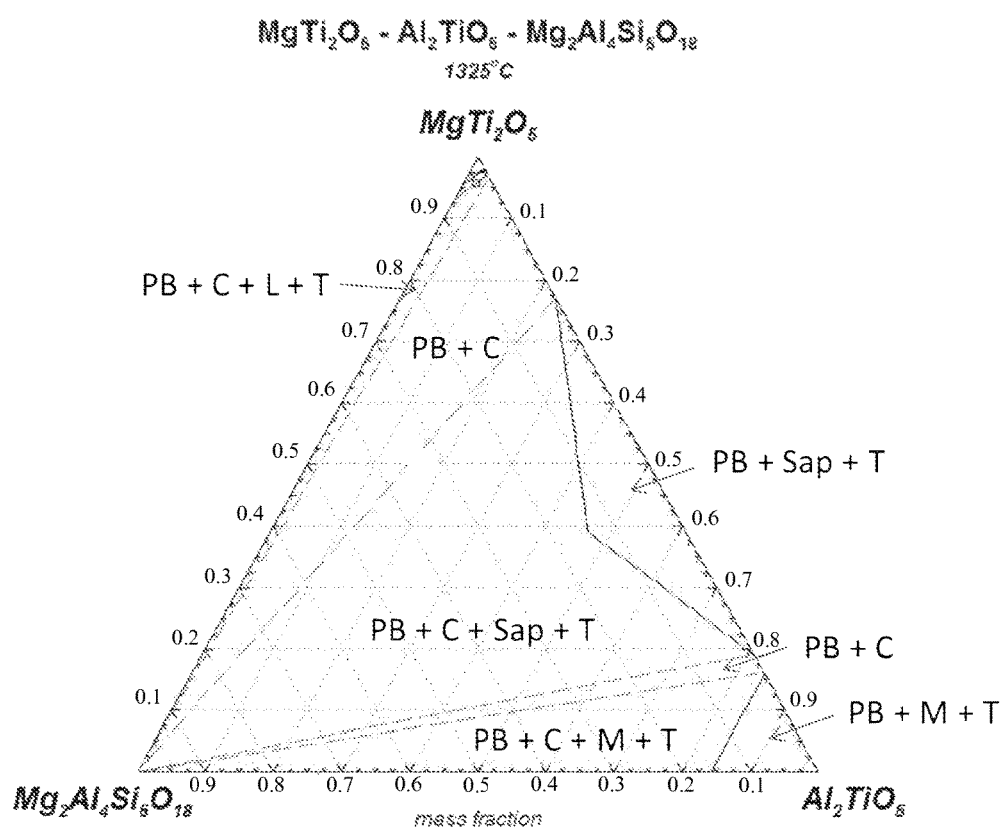
FIGS. 2A and 2B depict the approximate phase relations at 1325° C. in the pseudo-ternary sections with endpoints of magnesium dititanate, aluminum titanate, and cordierite within the quaternary $MgO$—$Al_2O_3$—$TiO_2$—$SiO_2$ system.
Figure 2B:
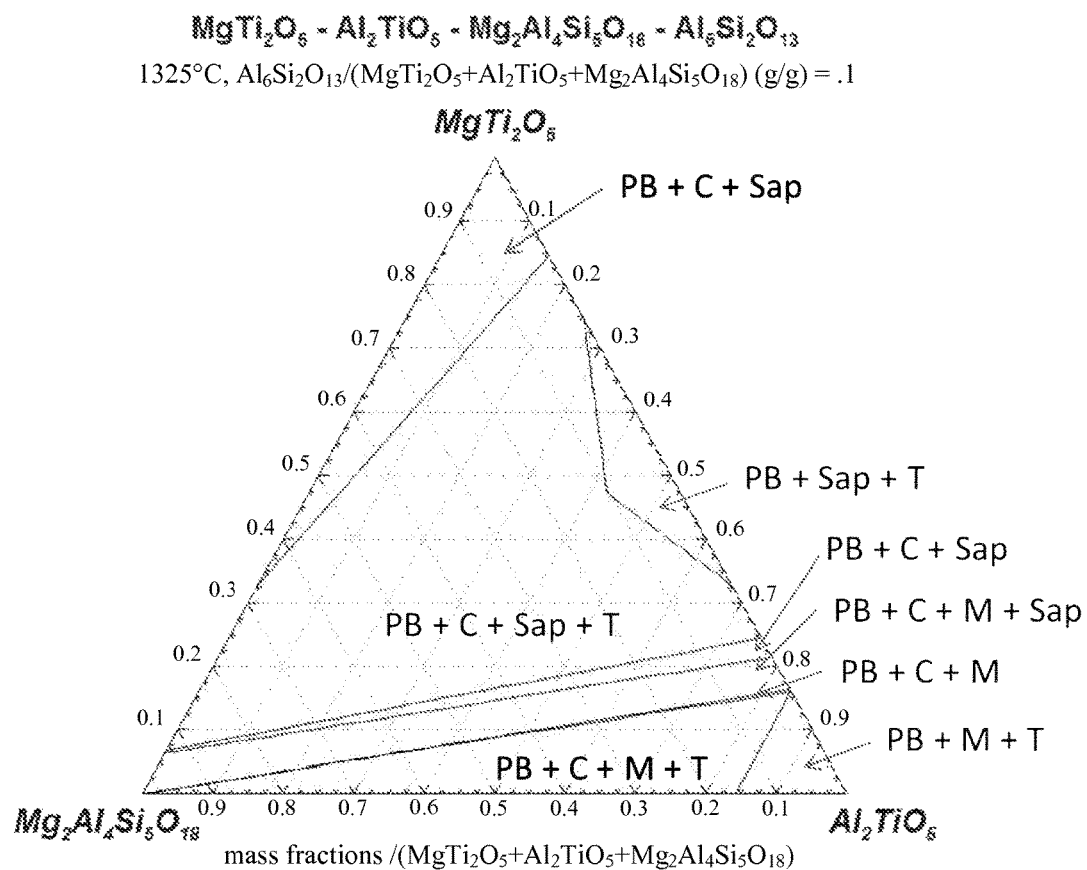

Two significant features can be derived from a study of this diagram. First, in order for the pseudobrookite phase to be in equilibrium with cordierite there is a general restriction on the composition of the solid-solution, in particular, pure AT will tend to not exist in equilibrium with cordierite. FIGS. 2A and 2B calculated using Factsage™ (by Thermfact and GTT-Technologies) depict the phase relations at 1325° C. in the ternary section with endpoints of magnesium dititanate, aluminum titanate, and cordierite within the quaternary $MgO$—$Al_2O_3$—$TiO_2$—$SiO_2$ system, showing that the pseudobrookite phase PB in equilibrium with cordierite C contains at least about 25 wt % magnesium dititanate at this temperature. FIG. 2A shows the cordierite-pseudobrookite phase diagram depicting the pseudobrookite PB, cordierite C, mullite M, sapphirine Sap, titania T, and liquid phase relations at 1325° C. FIG. 2B shows the cordierite-pseudobrookite phase diagram with 10 wt % mullite depicting the pseudobrookite PB, cordierite C, mullite M, sapphirine Sap, titania T, and liquid phase relations at 1325° C.

Second, FIG. 1 shows that a liquid appears in the diagram at fairly low temperatures (~1390° C., although the lowest eutectic liquid in this system exists well below this).

EXAMPLES

Exemplary embodiments of the claimed invention are further described below with respect to certain exemplary and specific embodiments thereof, which are illustrative only and not intended to be limiting. In accordance with some of the examples, a series of inventive ceramic articles is prepared having the general inorganic batch composition as provided in Table 1, in terms of the weight percentages of the end-member phases, and as provided in Table 2, expressed in terms of the weight percentages of the single component oxides, excluding any sintering additive.

TABLE 1

| Formula | Name | Weight % |
| --- | --- | --- |
| $Al_2TiO_5$ | AT | 40 |
| $MgTi_2O_5$ | MT2 | 20 |
| $Al_6Si_2O_{13}$ | Mullite | 25 |
| $Mg_2Al_4Si_5O_{18}$ | Cordierite | 15 |

TABLE 2

| Metal Oxide | Weight % |
| --- | --- |
| MgO | 6.10 |
| $Al_2O_3$ | 45.61 |
| $TiO_2$ | 33.54 |
| $SiO_2$ | 14.76 |

Tables 3 to 5 provide data for the composite aluminum titanate-magnesium dititanate cordierite examples fabricated according to the general composition of Tables 1 and 2. Listed are the raw materials, pore formers, and sintering aid (median particle diameters in parentheses) used to make the samples. The examples provided have been made by mulling component powders with water and an organic binder, followed by extrusion, drying, and firing. All extruded samples were wrapped in foil and hot-air dried. Samples were subsequently fired in an electric kiln by heating at 60° C./hr to a first soak temperature and holding for 6 hours, then heated at 60° C./hr to a second soak temperature and held for another 6 hours. Soak temperatures are also provided in Tables 3 to 5. These examples will be discussed further below. All measurements, except where noted, were on cellular pieces with 200 cells per square inch and 406 μm (16 mil) wall thicknesses. All samples were fired in air in electric furnaces unless otherwise noted. CTE was measured parallel to the honeycomb channels by dilatometry. Porosity and pore size distribution were derived from mercury porosimetry measurements.

Also provided in Tables 3 to 5 is the "maximum ΔL at 1000° C.," defined as the value of ΔL/L at 1000° C. due to thermal expansion upon heating a thermal expansion specimen to 1000° C. from room temperature, minus the minimum value of ΔL/L that occurs during cooling of a thermal expansion specimen from 1000° C. to that lower temperature at which the minimum value of ΔL/L exists. The values of maximum ΔL at 1000° C. are reported in Tables 3 to 5 as a percentage value; thus, for example, a maximum ΔL at 1000° C. of 0.15% is equal to a ΔL value of $0.15 \times 10^{-2}$, which is also equivalent to 1500 ppm, or $1500 \times 10^{-6}$ inches/inch. The value of maximum ΔL at 1000° C. is a measure of the degree of hysteresis between the thermal expansion curves (ΔL/L vs. temperature) during heating and cooling.

In addition to measurement of the property data in Tables 3 to 5, several special measurements were made to characterize the thermal stability of the aluminum titanate-magnesium dititanate and cordierite composite materials, and to determine their pressure drop behavior when used as a diesel particulate filter.

Figure 3:
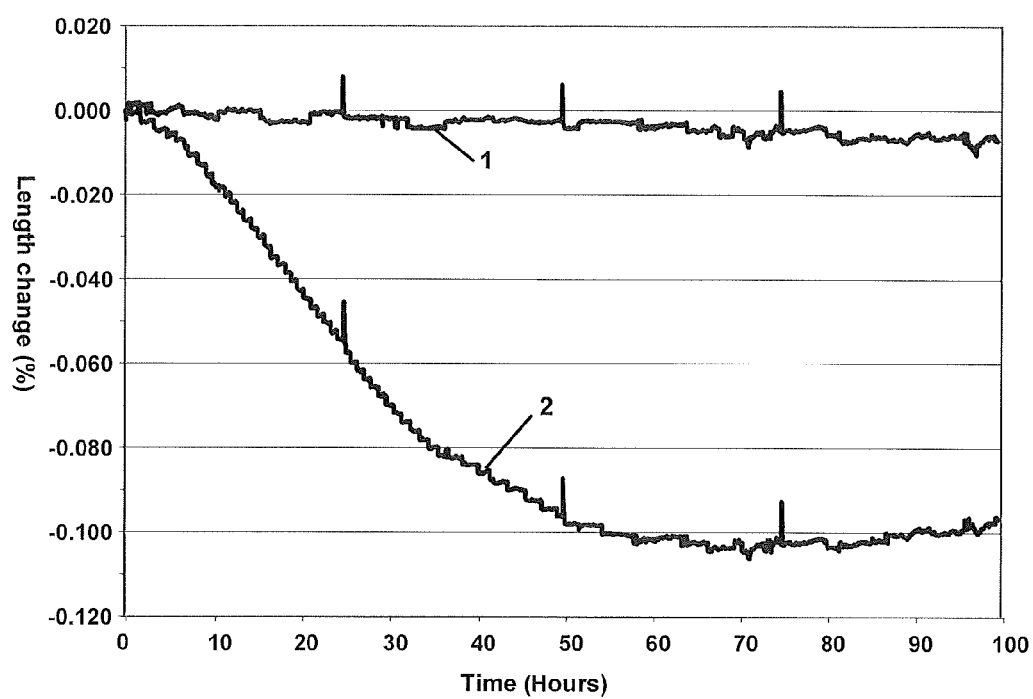
FIG. 3 illustrates the change in length as a function of time at 1100° C. for a control aluminum titanate ceramic composition and for a composition in the cordierite/mullite/pseudobrookite region of the phase diagram.
Figure 4:
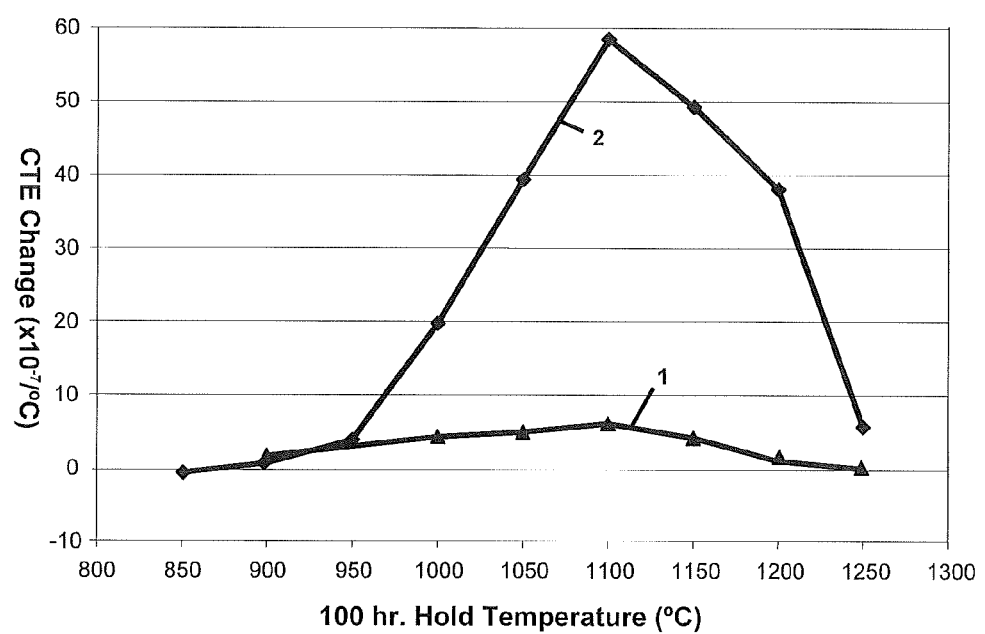
FIG. 4 demonstrates the change in the 25-1000° C. coefficient of thermal expansion for a control aluminum titanate ceramic composition and the cordierite/mullite/pseudobrookite composition of Table 1 after 100 hours at temperatures of from 950 to 1250° C.

The thermal stability (decomposition rate) was assessed by two methods. In the first method, specimens of the aluminum titanate-magnesium dititanate and cordierite composite materials and of a control aluminum titanate composition were held at 1100° C. and their lengths monitored over time for up to 100 hours. Decomposition of the pseudobrookite phase is accompanied by a decrease in volume (shrinkage, or negative length change). The results, shown in FIG. 3, demonstrate the superior stability of the aluminum titanate-magnesium dititanate and cordierite composite materials, for which the decomposition rate of the pseudobrookite phase is at least 10 times slower than for the control aluminum titanate composition. In a second method to assess decomposition rate, the CTE of the aluminum titanate-magnesium dititanate and cordierite composite materials and control aluminum titanate composition was measured before and after isothermally holding the sample for 100 hours at temperatures of from 950 to 1250° C. Because the decomposition of the pseudobrookite phase reduces the amount of microcracking, raising the CTE, the increase in CTE after heat treatment is an indication of the degree of decomposition. The results are shown in FIG. 4, and demonstrate the improved thermal stability of the aluminum titanate-magnesium dititanate and cordierite composite bodies.

Figure 5:
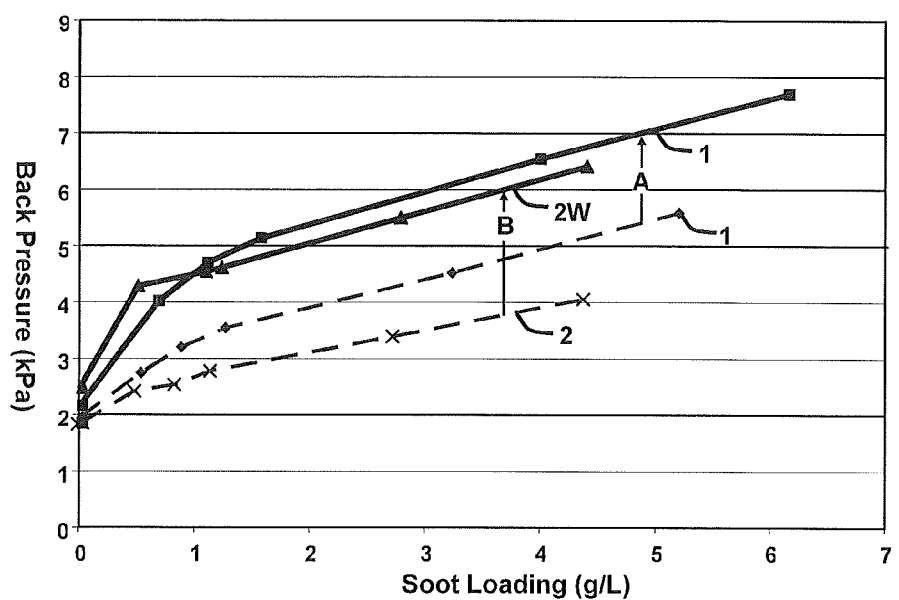
FIG. 5 shows representative data for pressure drop as a function of soot loading for a cordierite/mullite/pseudobrookite ceramic wall flow filter made in accordance with an exemplary embodiment of the disclosure.
Figure 6:
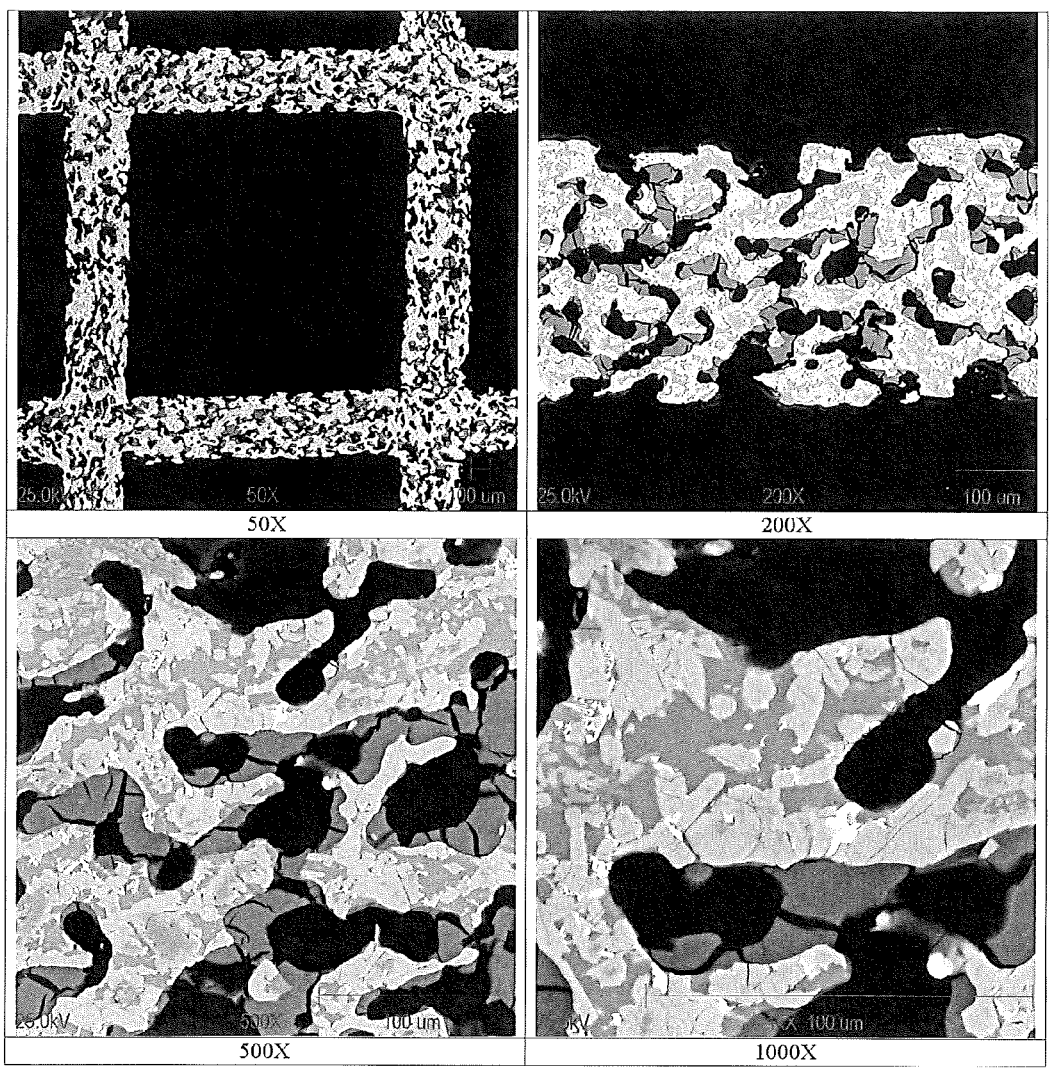
FIG. 6 depicts the microstructure of an exemplary embodiment of a disclosed body with approximately 55 grams/liter of alumina washcoat.

The pressure drops of clean and soot-loaded filters formed of a representative composite cordierite and aluminum titanate-magnesium dititanate ceramic and an aluminum titanate control ceramic were measured on the bare and catalyzed filters. The filter of the composite cordierite and aluminum titanate-magnesium dititanate ceramic was of 300/12 cell geometry. Washcoating was done after a conventional preliminary polymer solution passivation, using NYACOL® AL-20 colloidal alumina for the washcoat. Representative results of such pressure drop testing are set forth in FIG. 5, wherein the % increase in pressure drop after washcoating is found to be lower for the filter of the composite cordierite and aluminum titanate-magnesium dititanate ceramic than for the control aluminum titanate filter. The microstructure of the washcoated filter thus tested is shown in FIG. 6.

The data in Tables 3 to 5 further illustrate some of the exemplary ranges in properties that can be achieved with the composite cordierite and aluminum titanate-magnesium dititanate ceramic bodies of the current claimed invention. Examples 1 to 7 in Table 3 represent the baseline quaternary three-phase composition (Tables 1 and 2) with no sintering additive. These examples show that low thermal expansion (6 to $20 \times 10^{-7}/°$ C.) can be achieved with porosities (44-52%) and median pore diameters (15-27 μm) appropriate for application as a diesel particulate filter. The $d_f$ values range from 0.24 to 0.45. The optimum top firing temperature for these compositions is approximately 1355 to 1360° C. The coarser alumina used in Examples 4-7 results in higher pore size and lower firing shrinkage.

Examples 8 to 15 in Table 4 illustrate that the addition of about 2 wt. % $Y_2O_3$ to the base composition of Examples 1-3 allows a lower firing temperature, between 1290-1320° C., and a broader range of firing temperatures with high porosity (41-50%) and low thermal expansion (10 to $14 \times 10^{-7}/°$ C.). Median pore diameters are 16 to 22 μm, and $d_f$ values are reduced to 0.17 to 0.31. The change in shrinkage with firing temperature is also lower. This allows a wider process window to achieve the desired properties. The optimum firing temperature is approximately 1310° C.

Examples 16 to 22 in Table 5 demonstrate that the addition of only about 1% $Y_2O_3$ super-addition to the base composition of Examples 1-3 reduces the firing temperature to 1310-1350° C., with the optimum being approximately 1320° C. The lower level of additive results in a firing temperature and firing process window that is intermediate between the basic quaternary composition and that for 2 wt. % additive. Physical properties are still excellent for a diesel particulate filter application.

Examples 23-39 and 50-56 demonstrate that a sintering aid of cerium oxide, mixtures of cerium oxide and yttrium oxide, mixtures of cerium oxide, yttrium oxide, and lanthanum oxide, mixtures of cerium oxide and lanthanum oxide, or lanthanum oxide result in similar CTE, porosity, pore size, and pore size distribution at lower rare earth cost than yttrium oxide alone.

TABLE 3

| | Example Number | | | | | | |
|---|---|---|---|---|---|---|---|
| | 1 | 2 | 3 | 4 | 5 | 6 | 7 |
| Alumina A (24) | 44.76 | 44.76 | 44.76 | — | — | — | — |
| Alumina B (42) | — | — | — | 44.76 | 44.76 | 44.76 | 44.76 |
| Alumina C (10) | — | — | — | — | — | — | — |
| Alumina D (18) | — | — | — | — | — | — | — |
| Silica A (25) | — | — | — | — | — | — | — |
| Silica B (23) | 8.65 | 8.65 | 8.65 | 8.65 | 8.65 | 8.65 | 8.65 |
| Titania A (0.5) | 33.85 | 33.85 | 33.85 | 33.85 | 33.85 | 33.85 | 33.85 |
| Magnesia A (1.2) | 3.01 | 3.01 | 3.01 | 3.01 | 3.01 | 3.01 | 3.01 |
| Talc A (5.0) | 9.73 | 9.73 | 9.73 | 9.73 | 9.73 | 9.73 | 9.73 |
| Talc B (14.4) | — | — | — | — | — | — | — |
| Talc C (23) | — | — | — | — | — | — | — |
| $Y_2O_3$ | — | — | — | — | — | — | — |
| Graphite A (35) | 25.00 | 25.00 | 25.00 | 25.00 | 25.00 | 25.00 | 25.00 |
| Corn Starch (17) | — | — | — | — | — | — | — |
| Potato Starch (49) | — | — | — | — | — | — | — |
| First Soak Temperature (° C.) | 1320 | 1330 | 1335 | 1325 | 1330 | 1335 | 1340 |
| First Soak Time (hours) | 6 | 6 | 6 | 6 | 6 | 6 | 6 |
| Second Soak Temperature (° C.) | 1347 | 1357 | 1362 | 1352 | 1357 | 1362 | 1367 |
| Second Soak Time (hours) | 6 | 6 | 6 | 6 | 6 | 6 | 6 |
| Length Change after Firing (%) | 1.7 | −1.1 | −2.1 | 1.3 | 0.9 | 0.2 | −0.5 |

TABLE 3-continued

|  | Example Number | | | | | | |
|---|---|---|---|---|---|---|---|
|  | 1 | 2 | 3 | 4 | 5 | 6 | 7 |
| CTE, 25-800° C. ($10^{-7}$/° C.) | 16.2 | 9.8 | 6.3 | 8.7 | 4.9 | 3.0 | 6.6 |
| CTE, 25-1000° C. ($10^{-7}$/° C.) | 19.5 | 12.6 | 9.1 | 12.1 | 8.4 | 6.2 | 10.0 |
| Maximum ΔL at 1000° C. (%) | 0.22 | 0.19 | 0.17 | 0.17 | 0.15 | 0.15 | 0.15 |
| % Porosity | 52.1 | 50.6 | 44.0 | 52.1 | 51.5 | 51.5 | 44.6 |
| $d_{50}$ (microns) | 14.5 | 15.1 | 16.1 | 23.2 | 23.5 | 22.5 | 27.3 |
| $(d_{50} - d_{10})/d_{50}$ | 0.45 | 0.44 | 0.27 | 0.42 | 0.38 | 0.38 | 0.24 |
| $(d_{90} - d_{10})/d_{50}$ | 1.16 | 1.08 | 1.01 | 1.26 | 1.09 | 1.45 | 1.19 |

TABLE 4

|  | Example Number | | | | | | | |
|---|---|---|---|---|---|---|---|---|
|  | 8 | 9 | 10 | 11 | 12 | 13 | 14 | 15 |
| Alumina A (24) | 43.90 | 43.90 | 43.90 | 43.90 | 43.90 | 43.90 | 43.90 | 43.90 |
| Alumina B (42) | — | — | — | — | — | — | — | — |
| Alumina C (10) | — | — | — | — | — | — | — | — |
| Alumina D (18) | — | — | — | — | — | — | — | — |
| Silica A (25) | — | — | — | — | — | — | — | — |
| Silica B (23) | 8.48 | 8.48 | 8.48 | 8.48 | 8.48 | 8.48 | 8.48 | 8.48 |
| Titania A (0.5) | 33.19 | 33.19 | 33.19 | 33.19 | 33.19 | 33.19 | 33.19 | 33.19 |
| Magnesia A (1.2) | 2.96 | 2.96 | 2.96 | 2.96 | 2.96 | 2.96 | 2.96 | 2.96 |
| Talc A (5.0) | 9.54 | 9.54 | 9.54 | 9.54 | 9.54 | 9.54 | 9.54 | 9.54 |
| Talc B (14.4) | — | — | — | — | — | — | — | — |
| Talc C (23) | — | — | — | — | — | — | — | — |
| $Y_2O_3$ | 1.94 | 1.94 | 1.94 | 1.94 | 1.94 | 1.94 | 1.94 | 1.94 |
| Graphite A (35) | 30.00 | 30.00 | 30.00 | 30.00 | 30.00 | 30.00 | 30.00 | 30.00 |
| Corn Starch (17) | — | — | — | — | — | — | — | — |
| Potato Starch (49) | — | — | — | — | — | — | — | — |
| First Soak Temperature (° C.) | 1275 | 1285 | 1290 | 1295 | 1305 | 1315 | 1320 | 1330 |
| First Soak Time (hours) | 6 | 6 | 6 | 6 | 6 | 6 | 6 | 6 |
| Second Soak Temperature (° C.) | 1302 | 1312 | 1317 | 1322 | 1332 | 1342 | 1347 | 1357 |
| Second Soak Time (hours) | 6 | 6 | 6 | 6 | 6 | 6 | 6 | 6 |
| Length Change after Firing (%) | -1.9 | -2.8 | -2.6 | -3.5 | -4.3 | -4.6 | -4.9 | -6.5 |
| CTE, 25-800° C. ($10^{-7}$/° C.) | 6.8 | 7.4 | 6.3 | 7.4 | 7.5 | 11.2 | 9.6 | 8.3 |
| CTE, 25-1000° C. ($10^{-7}$/° C.) | 10.2 | 10.8 | 10.0 | 10.8 | 11.3 | 13.9 | 13.5 | 11.7 |
| Maximum ΔL at 1000° C. (%) | 0.17 | 0.17 | 0.18 | 0.16 | 0.17 | 0.18 | 0.18 | 0.17 |
| % Porosity | 50.4 | 48.3 | 49.3 | 47.2 | 45.7 | 43.9 | 41.5 | 41.1 |
| $d_{50}$ (microns) | 16.0 | 17.0 | 16.6 | 18.0 | 20.1 | 22.0 | 20.2 | 21.6 |
| $(d_{50} - d_{10})/d_{50}$ | 0.31 | 0.27 | 0.30 | 0.23 | 0.21 | 0.17 | — | 0.17 |
| $(d_{90} - d_{10})/d_{50}$ | — | — | 0.75 | 0.60 | 0.71 | 0.79 | — | 0.87 |

TABLE 5

|  | Example Number | | | | | | |
|---|---|---|---|---|---|---|---|
|  | 16 | 17 | 18 | 19 | 20 | 21 | 22 |
| Alumina A (24) | 44.33 | 44.33 | 44.33 | 44.33 | 44.33 | 44.33 | 44.33 |
| Alumina B (42) | — | — | — | — | — | — | — |
| Alumina C (10) | — | — | — | — | — | — | — |
| Alumina D (18) | — | — | — | — | — | — | — |
| Silica A (25) | — | — | — | — | — | — | — |
| Silica B (23) | 8.56 | 8.56 | 8.56 | 8.56 | 8.56 | 8.56 | 8.56 |
| Titania A (0.5) | 33.52 | 33.52 | 33.52 | 33.52 | 33.52 | 33.52 | 33.52 |
| Magnesia A (1.2) | 2.99 | 2.99 | 2.99 | 2.99 | 2.99 | 2.99 | 2.99 |
| Talc A (5.0) | 9.63 | 9.63 | 9.63 | 9.63 | 9.63 | 9.63 | 9.63 |
| Talc B (14.4) | — | — | — | — | — | — | — |
| Talc C (23) | — | — | — | — | — | — | — |
| $Y_2O_3$ | 0.98 | 0.98 | 0.98 | 0.98 | 0.98 | 0.98 | 0.98 |
| Graphite A (35) | 30.00 | 30.00 | 30.00 | 30.00 | 30.00 | 30.00 | 30.00 |
| Corn Starch (17) | — | — | — | — | — | — | — |
| Potato Starch (49) | — | — | — | — | — | — | — |
| First Soak Temperature (° C.) | 1285 | 1290 | 1295 | 1305 | 1315 | 1320 | 1330 |
| First Soak Time (hours) | 6 | 6 | 6 | 6 | 6 | 6 | 6 |
| Second Soak Temperature (° C.) | 1312 | 1317 | 1322 | 1332 | 1342 | 1347 | 1357 |
| Second Soak Time (hours) | 6 | 6 | 6 | 6 | 6 | 6 | 6 |

TABLE 5-continued

| | Example Number | | | | | | |
|---|---|---|---|---|---|---|---|
| | 16 | 17 | 18 | 19 | 20 | 21 | 22 |
| Length Change after Firing (%) | −0.9 | −0.3 | −1.1 | −2.6 | −3.7 | −3.9 | −5.1 |
| CTE, 25-800° C. ($10^{-7}$/° C.) | 11.3 | 11.6 | 8.4 | 8.4 | 7.2 | 6.3 | 10.8 |
| CTE, 25-1000° C. ($10^{-7}$/° C.) | 14.6 | 15.3 | 11.8 | 11.7 | 10.9 | 9.7 | 14.3 |
| Maximum ΔL at 1000° C. (%) | 0.19 | 0.20 | 0.17 | 0.18 | 0.17 | 0.18 | 0.18 |
| % Porosity | 51.3 | 51.9 | 50.5 | 51.1 | 43.9 | 43.9 | 42.5 |
| $d_{50}$ (microns) | 14.5 | 13.9 | 15.3 | 16.0 | 18.1 | 18.5 | 20.1 |
| $(d_{50} - d_{10})/d_{50}$ | 0.39 | 0.45 | 0.35 | 0.33 | 0.23 | 0.22 | 0.17 |
| $(d_{90} - d_{10})/d_{50}$ | 1.17 | 0.80 | 0.84 | 0.75 | 0.66 | 0.67 | 0.93 |

Examples 23-26 in Table 6 and Examples 41-49 in Table 13 include yttrium oxide as a sintering aid. Examples 27-30 in Table 6 and Examples 50-55 in Table 13 include cerium oxide. Examples 31 and 32 in Table 6 contain both yttrium oxide and cerium oxide. Examples 38 and 39 in Table 10 and Example 56 in Table 13 include lanthanum oxide as a sintering aid. Example 40 in Table 10 includes no additional sintering aid. The formulation of these examples is shown in Tables 6, 10, and 13. Examples 23-32 all used 4% graphite and 22% starch (added as a superaddition to the inorganic materials in Tables 6), and 4.5% methylcellulose and 1% tall oil added as superadditions to all the other batch components. These examples were mixed with deionized water, extruded into a cellular structure with 300 cells per square inch and 330 μm (13 mil) wall thickness, dried and fired in gas-fired kilns to 1350° C. for 16 hours. The properties of the fired ware for examples 23-32 are shown in Table 6 along with a relative cost estimate for the additive based on current market prices normalized to the cost of 1% $Y_2O_3$.

Table 7 lists some representative prices of rare-earth materials, which are at least a factor of 10 higher than all the other batch materials.

Figure 7:
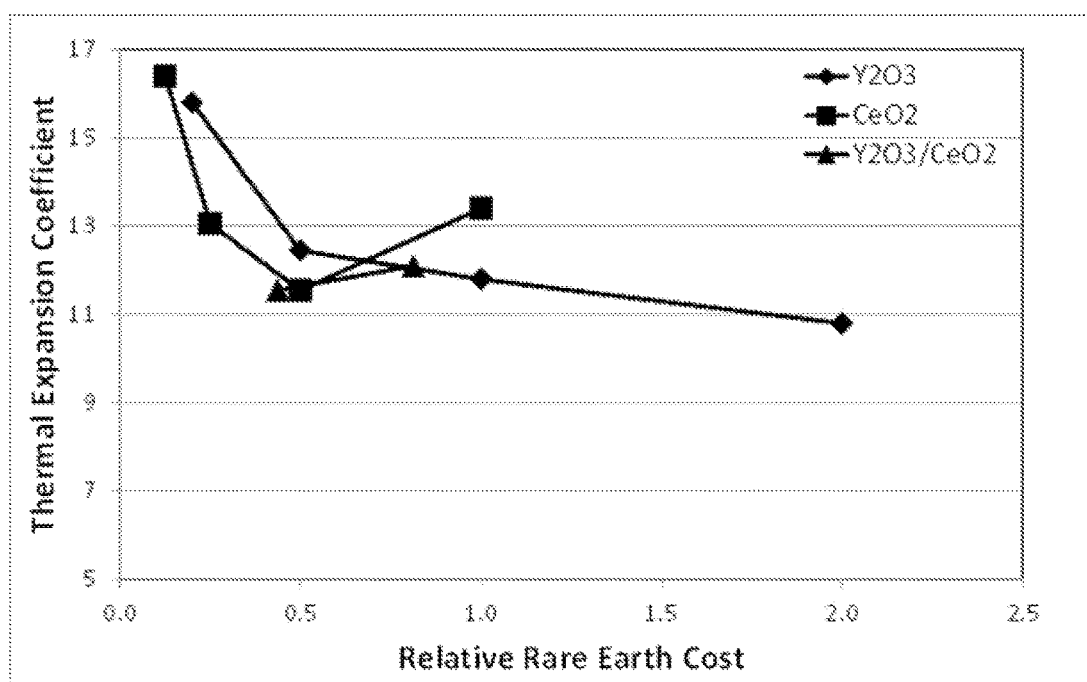
FIG. 7 shows the coefficient of thermal expansion (CTE) as a function of relative rare earth cost (1% $Y_2O_3$=1) for exemplary embodiments of the disclosure.

FIG. 7 shows the coefficient of thermal expansion (CTE) as a function of relative rare earth cost (1% $Y_2O_3$=1) for the comparative examples 23-26 and the Examples 27-32 of Table 6. As FIG. 7 illustrates, the cost to attain a CTE below a given value, for example, below $12 \times 10^{-7}$/° C. is lower for cerium oxide or yttrium oxide and cerium oxide mixtures than for yttrium oxide alone while retaining similar pore size, porosity and pore size distribution (Table 6). The rare earth cost reduction possible is at least 50% using this metric.

These lower cost compositions show similar stability of properties with firing temperature as the higher-cost compositions. Table 8 shows the properties of Examples 24, 25, 28, and 32 after firing for 12 hours at 1320, 1330, 1340, 1350 and 1360° C. in an electric kiln. The porosity was measured by the Archimedes method (Arch Porosity).

TABLE 6

| | Example Number | | | | | | |
|---|---|---|---|---|---|---|---|
| | 23 | 24 | 25 | 26 | 27 | 28 | 29 |
| Alumina A (24) | — | — | — | — | — | — | — |
| Alumina B (42) | — | — | — | — | — | — | — |
| Alumina C (10) | 44.31 | 44.18 | 43.97 | 43.54 | 44.18 | 43.97 | 43.54 |
| Alumina D (18) | — | — | — | — | — | — | — |
| Silica A (25) | — | — | — | — | — | — | — |
| Silica B (23) | 2.72 | 2.71 | 2.69 | 2.67 | 2.71 | 2.69 | 2.67 |
| Titania A (0.5) | 33.62 | 33.52 | 33.36 | 33.03 | 33.52 | 33.36 | 33.03 |
| Magnesia A (1.2) | | | | | | | |
| Talc A (5.0) | 19.16 | 19.10 | 19.01 | 18.82 | 19.10 | 19.01 | 18.82 |
| Talc B (14.4) | — | — | — | — | — | — | — |
| Talc C (23) | | | | | | | |
| $Y_2O_3$ | 0.20 | 0.50 | 1.00 | 2.00 | — | — | — |
| $CeO_2$ | — | — | — | — | 0.50 | 1.00 | 2.00 |
| Graphite A (35) | 4.0 | 4.0 | 4.0 | 4.0 | 4.0 | 4.0 | 4.0 |
| Corn Starch (17) | — | — | — | — | — | — | — |
| Potato Starch (49) | 22 | 22 | 22 | 22 | 22 | 22 | 22 |
| First Soak Temperature (° C.) | 1350 | 1350 | 1350 | 1350 | 1350 | 1350 | 1350 |
| First Soak Time (hours) | 16 | 16 | 16 | 16 | 16 | 16 | 16 |
| Length Change after Firing (%) | −2.0 | −2.7 | −2.8 | −3.7 | −2.1 | −2.7 | −3.7 |
| CTE, 25-800° C. ($10^{-7}$/° C.) | 12.8 | 9.6 | 9.2 | 8.2 | 13.3 | 10.1 | 8.6 |
| CTE, 25-1000° C. ($10^{-7}$/° C.) | 15.8 | 12.5 | 11.8 | 10.8 | 16.4 | 13.1 | 11.6 |
| % Porosity | 55 | 53 | 52 | 52 | 55 | 53 | 53 |
| $d_{50}$ (microns) | 11 | 12 | 13 | 14 | 12 | 13 | 14 |
| $(d_{50} - d_{10})/d_{50}$ | 0.28 | 0.22 | 0.17 | 0.16 | 0.21 | 0.19 | 0.16 |
| $(d_{90} - d_{10})/d_{50}$ | 0.52 | 0.46 | 0.36 | 0.35 | 0.44 | 0.38 | 0.35 |
| Relative RE Cost | 0.20 | 0.50 | 1.00 | 2.00 | 0.13 | 0.25 | 0.50 |

| | Example Number | | |
|---|---|---|---|
| | 30 | 31 | 32 |
| Alumina A (24) | — | — | — |
| Alumina B (42) | — | — | — |
| Alumina C (10) | 42.72 | 43.97 | 43.97 |

TABLE 6-continued

| | | | |
|---|---|---|---|
| Alumina D (18) | — | — | — |
| Silica A (25) | — | — | — |
| Silica B (23) | 2.62 | 2.69 | 2.69 |
| Titania A (0.5) | 32.41 | 33.36 | 33.36 |
| Magnesia A (1.2) | — | — | — |
| Talc A (5.0) | 18.47 | 19.01 | 19.01 |
| Talc B (14.4) | — | — | — |
| Talc C (23) | — | — | — |
| $Y_2O_3$ | — | 0.75 | 0.25 |
| $CeO_2$ | 4.00 | 0.25 | 0.75 |
| Graphite A (35) | 4.0 | 4.0 | 4.0 |
| Corn Starch (17) | — | — | — |
| Potato Starch (49) | 22 | 22 | 22 |
| First Soak Temperature (° C.) | 1350 | 1350 | 1350 |
| First Soak Time (hours) | 16 | 16 | 16 |
| Length Change after Firing (%) | −4.5 | −3.1 | −3.2 |
| CTE, 25-800° C. ($10^{-7}$/° C.) | 10.4 | 9.1 | 8.5 |
| CTE, 25-1000° C. ($10^{-7}$/° C.) | 13.4 | 12.1 | 8.5 |
| % Porosity | 50 | 54 | 53 |
| $d_{50}$ (microns) | 17 | 13 | 13 |
| $(d_{50} - d_{10})/d_{50}$ | 0.16 | 0.22 | 0.19 |
| $(d_{90} - d_{10})/d_{50}$ | 0.32 | 0.42 | 0.43 |
| Relative RE Cost | 1.00 | 0.81 | 0.44 |

TABLE 7

| Metal | Cost in Mar, 2012 ($/kg) | Cost in Dec, 2011 ($/kg) |
|---|---|---|
| Lanthanum Oxide ≥ 99.5% | 19 | 35 |
| Cerium Oxide ≥ 99.5% | 16 | 30 |
| Yttrium Oxide ≥ 99.99% | 95 | 95 |

TABLE 8

| Example Number | Firing Temperature (C.) | Soak time | Arch Porosity | d50 | df | db | CTE 800 | CTE 1000 | Firing Length Change |
|---|---|---|---|---|---|---|---|---|---|
| 24 | 1320 | 12 | 54 | 12 | 0.21 | 0.47 | 14.6 | 17.7 | −1.3 |
| 24 | 1330 | 12 | 55 | 12 | 0.22 | 0.48 | 12.4 | 15.7 | −1.5 |
| 24 | 1340 | 12 | 55 | 13 | 0.20 | 0.44 | 13.4 | 16.8 | −1.2 |
| 24 | 1350 | 12 | 54 | 14 | 0.16 | 0.41 | 12.9 | 15.9 | −1.3 |
| 24 | 1360 | 12 | 50 | 15 | 0.15 | 0.42 | 12.4 | 15.4 | −3.3 |
| 24 | 1320 | 12 | 54 | 13 | 0.16 | 0.39 | 11.7 | 14.9 | −1.9 |
| 25 | 1330 | 12 | 54 | 13 | 0.18 | 0.37 | 10.9 | 14.0 | −2.1 |
| 25 | 1340 | 12 | 54 | 14 | 0.16 | 0.36 | 11.7 | 14.6 | −1.6 |
| 25 | 1350 | 12 | 51 | 15 | 0.15 | 0.39 | 12.0 | 15.1 | −3.2 |
| 25 | 1360 | 12 | 48 | 16 | 0.14 | 0.43 | 13.0 | 16.2 | −5.5 |
| 28 | 1320 | 12 | 54 | 13 | 0.18 | 0.36 | 16.3 | 19.4 | −2.4 |
| 28 | 1330 | 12 | 55 | 14 | 0.17 | 0.37 | 14.7 | 18.0 | −1.5 |
| 28 | 1340 | 12 | 54 | 15 | 0.15 | 0.35 | 14.2 | 17.5 | −1.1 |
| 28 | 1350 | 12 | 54 | 15 | 0.20 | 0.39 | 15.1 | 18.0 | −2.0 |
| 28 | 1360 | 12 | 49 | 16 | 0.23 | 0.48 | 13.3 | 16.4 | −5.1 |
| 32 | 1320 | 12 | 54 | 13 | 0.17 | 0.35 | 13.4 | 16.8 | −2.3 |
| 32 | 1330 | 12 | 54 | 14 | 0.14 | 0.34 | 13.1 | 16.3 | −2.5 |
| 32 | 1340 | 12 | 54 | 14 | 0.15 | 0.36 | 12.0 | 15.2 | −1.9 |
| 32 | 1350 | 12 | 52 | 15 | 0.17 | 0.40 | 12.6 | 15.8 | −2.9 |
| 32 | 1360 | 12 | 47 | 15 | 0.18 | 0.43 | 13.3 | 16.5 | −6.5 |

Examples 33-40 and 57-68 were made by dry-blending a large batch of the composition shown in Table 9 and adding the additions shown in Table 10 and dry-blending again. The powder for each batch was pressed in a die to form a 8×8×65 mm bar before firing. Tables 11 to 16 provide data for the inventive examples fabricated according to the general composition of Tables 9 and 10. The data parameters provided are as described above for Tables 3 to 5.

Examples 33 and 34 in Table 11 use cerium oxide as a sintering aid. Examples 35-39, shown in Table 11 use lanthanum oxide ($La_2O_3$) or mixtures of $La_2O_3$ with cerium oxide. Comparative example 40 in Table 10 uses the batch composition with no sintering aid additive. Properties for Examples 33-39 after firing at 1330° C. for 12 hours in an electric kiln are shown in Table 11. These results are similar to $CeO_2$ or $Y_2O_3$ alone, but with an approximately $3 \times 10^{-7}$/° C. higher thermal expansion coefficient than with $CeO_2$ or $Y_2O_3$ alone.

Table 15 shows the properties as a function of firing temperature with a 16 hour hold time for Examples 33 and 40 showing that $CeO_2$ provides a wide firing window.

To further reduce cost, CaO, SrO and mixtures of CaO and/or SrO with $CeO_2$ can be used to achieve acceptable porosity, pore size distribution, CTE values, and firing window properties compared to yttrium oxide and/or yttrium oxide and a lanthanide oxide alone and at a lower relative rare earth cost compared to yttrium oxide and/or a lanthanide oxide alone. Properties of Examples 57-61 after firing in an electric kiln at 1330° C. for 12 hours are shown in Table 12. Properties of Examples 69 to 72 are shown in Table 14. When compared with Example 33 in Table 11, Examples 58-61 and 69 to 72 show that CaO can be added to this family of compositions to achieve similar porosity, pore size, and pore size distribution as attained with $CeO_2$ or $Y_2O_3$, with $4$-$5 \times 10^{-7}$/° C. higher thermal expansion coefficient (with less than a tenth of a percent of the cost for the additive).

Examples 62-66, shown in Table 10 use SrO or mixtures of SrO with cerium oxide as a sintering aid. Properties for Examples 62-66 after firing at 1330° C. for 12 hours in an electric kiln are shown in Table 12. These results are similar to CaO as a sintering aid, but with a $5$-$7 \times 10^{-7}$/° C. higher thermal expansion coefficient than with $CeO_2$ alone. However, the cost of using SrO is about 0.1% of the relative cost of using $Y_2O_3$.

Table 16 shows the properties of Examples 60, 61, 65, and 66 after firing at 1310, 1320, 1330, 1340, 1350, and 1360° C. for 16 hours. Table 16 shows the properties as a function of firing temperature with a 16 hour hold time for Examples 60, 61, 65, and 66 showing that CaO and SrO provide a wide firing window.

In the exemplary embodiments of the composite aluminum titanate-magnesium dititanate and cordierite described thus far, the addition of CaO and SrO as a sintering aid compared with $CeO_2$ additions appeared to result in a higher coefficient of thermal expansion (CTE). The inventors discovered that reheating compositions with CaO and SrO additions after firing to temperatures below the original firing temperature, but above a post-fire threshold temperature resulted in a lower thermal expansion coefficient (CTE). The reduction in thermal expansion coefficient observed is shown in Table 17. The Inventors discovered the post-fire threshold temperature to be about 1000° C. and that this temperature is time dependent. Table 17 shows a change in CTE from room temperature (RT) to 1000° C., where RT is about 23 to 25° C., relative to the same composition fired to the same top temperature and time (1330° C. for 12 hours), but cooled directly to RT at a constant rate of 200° C./hr for Examples 33, 61, and 65 after the indicated changes in heat treatments.

Figure 8:
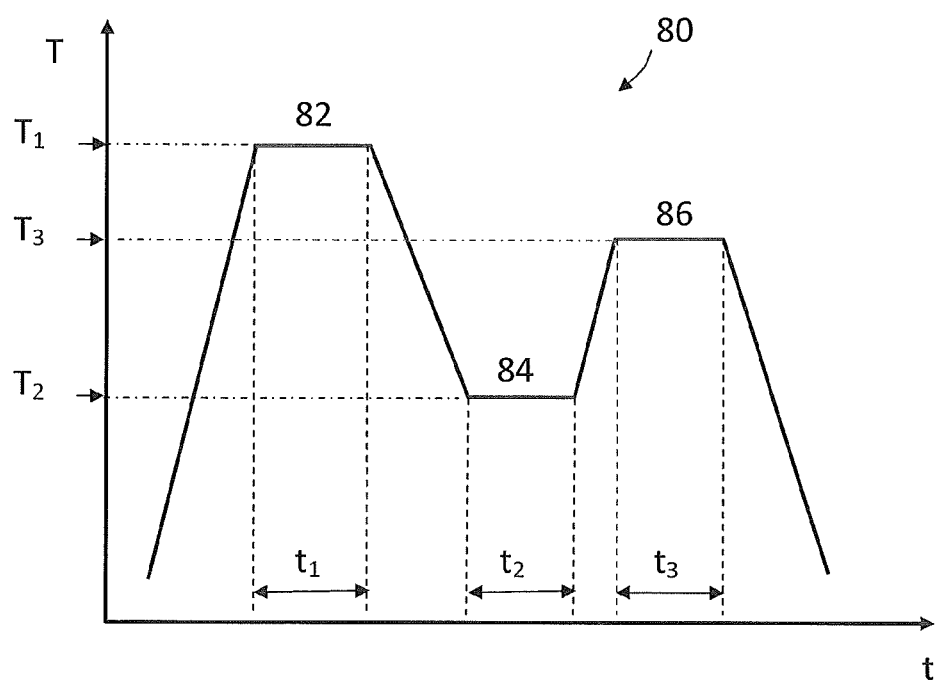
FIG. 8 shows schematic exemplary embodiment of a time-temperature (t-T) graph 80 illustrating top (first hold) temperature 82, low (second hold) temperature 84, and mid (third hold) temperature 86.

Further testing of exemplary embodiments of the claimed composite aluminum titanate-magnesium dititanate and cordierite composition was conducted. The range of heat treatment to lower the CTE was further defined by exploring a range of times and temperatures. FIG. 8 shows schematic exemplary embodiment of a time-temperature (t-T) graph 80 illustrating top (first hold) temperature 82, low (second hold) temperature 84, and mid (third hold) temperature 86. The time at the top (first hold) temperature 82 is a first hold time $t_1$, the time at the low (second hold) temperature 84 is a second hold time $t_2$, and the time at the mid (third hold) temperature 86 is a third hold time $t_3$. According to the schematic exemplary embodiment shown in FIG. 8, the top temperature 82 is at $T_1$, the low temperature 84 is at $T_2$, and the mid temperature 86 is at $T_3$. $T_3$ is greater than the threshold temperature (not shown) and less than $T_1$. The threshold temperature (not shown) is at a temperature less than $T_1$ and greater than $T_2$.

Table 18 shows the CTE data for Examples 33 and 61 using a range of low and mid temperatures 84 and 86 and times (t). Table 19 shows the properties after firing to 1320° C. for 16 hours and the CTE after reheating to 1250° C./hrs for Examples 34, 60, 61, 67, and 68. The time-temperature data of Tables 17, 18, and 19 show that both time and the low temperature 84 have an impact on the final CTE. The composite aluminum titanate-magnesium dititanate and cordierite material compositions of the exemplary embodiments should be cooled below about 400° C. to gain a substantial impact of the post-fire heat treatment. The time-temperature data of Tables 17 and 18 also shows that times as low as 2 hours at the mid temperature 86 can reduce the CTE significantly from the as-fired value.

For example, the low temperature 84 may be in a range of 25° C. to 500° C., the time $t_2$ at the low temperature 84 may be in a range of 1 hour to 48 hours, the mid temperature 86 may be in a range of 850° C. to 1350° C., and the time $t_3$ at the mid temperature 86 may be in a range of 1 hour to 24 hours. The top temperature may be from 1250° C. to 1450° C., for example, 1330° C. to 1380° C., and the soak time $t_1$ may be in a range from 2 to 24 hours.

Table 20 includes analyzed phases and pseudobrookite composition in wt % as determined by X-Ray Diffraction (XRD) for Examples 53, 54, 57, and 58. These analyzed examples were all fired at 1365° C. The pseudobrookite composition was determined by the lattice parameters of the pseudobrookite phase as determined by XRD. The phase distribution was determined by Rietveld refinement of the XRD pattern.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

TABLE 9

| | |
|---|---|
| Alumina C (10) | 44.42 |
| Silica A (25) | 2.73 |
| Titania A (0.5) | 33.66 |
| Talc C (23) | 19.19 |
| Pea Starch (27) | 19.00 |
| Graphite A (35) | 8.00 |

TABLE 10

| Example | Baseline Batch (%) | $CaCO_3$ (%) | $SrCO_3$ (%) | $CeO_2$ (%) | $La_2O_3$ (%) |
|---|---|---|---|---|---|
| 33 | 99.228 | — | — | 0.772 | — |
| 34 | 98.847 | — | — | 1.153 | — |
| 35 | 98.847 | — | — | 0.865 | 0.288 |
| 36 | 98.847 | — | — | 0.577 | 0.577 |
| 37 | 98.847 | — | — | 0.288 | 0.865 |
| 38 | 98.847 | — | — | — | 1.153 |
| 39 | 99.420 | — | — | — | 0.580 |
| 40 | 100.000 | — | — | — | — |
| 57 | 99.017 | 0.116 | — | 0.867 | — |
| 58 | 99.189 | 0.232 | — | 0.579 | — |
| 59 | 99.361 | 0.349 | — | 0.290 | — |
| 60 | 99.543 | 0.466 | — | — | — |
| 61 | 99.689 | 0.311 | — | — | — |
| 62 | 98.963 | — | 0.171 | 0.866 | — |
| 63 | 99.079 | — | 0.343 | 0.578 | — |
| 64 | 99.196 | — | 0.515 | 0.289 | — |
| 65 | 99.313 | — | 0.687 | — | — |
| 66 | 99.541 | — | 0.459 | — | — |
| 67 | 99.302 | 0.698 | — | — | — |
| 68 | 99.071 | 0.929 | — | — | — |

TABLE 11

| | Example Number | | | | | | |
|---|---|---|---|---|---|---|---|
| | 33 | 34 | 35 | 36 | 37 | 38 | 39 |
| $CeO_2$ | 1.00 | 1.50 | 1.13 | 0.75 | 0.38 | 0.00 | 0.00 |
| $La_2O_3$ | 0.00 | 0.00 | 0.38 | 0.75 | 1.13 | 1.50 | 0.75 |
| Length Change after Firing (%) | 0.03 | −0.26 | — | — | — | — | — |
| CTE, 25-800° C. ($10^{-7}$/° C.) | 13 | 11 | — | — | — | — | — |
| CTE, 25-1000° C. ($10^{-7}$/° C.) | 16 | 14 | 16 | 18 | 17 | 18 | 21 |
| % Porosity | 50 | 50 | 50 | 51 | 50 | 51 | 51 |
| $d_{50}$ (microns) | 13 | 13 | 13 | 13 | 13 | 13 | 12 |
| $(d_{50} - d_{10})/d_{50}$ | 0.23 | 0.17 | 0.20 | 0.23 | 0.20 | 0.23 | 0.28 |
| $(d_{90} - d_{10})/d_{50}$ | 0.37 | 0.29 | — | — | — | — | — |
| Relative RE Cost | 0.250 | 0.375 | — | — | — | — | — |

TABLE 12

| Example Number | 57 | 58 | 59 | 60 | 61 |
|---|---|---|---|---|---|
| $CeO_2$ | 1.13 | 0.75 | 0.38 | — | — |
| CaO | 0.08 | 0.17 | 0.25 | 0.23 | 0.34 |
| SrO | — | — | — | — | — |
| Length Change after Firing (A) | −0.07 | 0.04 | −0.90 | 0.11 | −0.14 |
| CTE, 25-800° C. ($10^{-7}$/° C.) | 12 | 13 | 16 | 17 | 16 |
| CTE, 25-1000° C. ($10^{-7}$/° C.) | 15 | 17 | 19 | 20 | 20 |
| % Porosity | 50 | 50 | 48 | 50 | 49 |
| $d_{50}$ (microns) | 13 | 13 | 14 | 13 | 13 |
| $(d_{50}-d_{10})/d_{50}$ | 0.22 | 0.21 | 0.22 | 0.28 | 0.22 |
| $(d_{90}-d_{10})/d_{50}$ | 0.35 | 0.30 | 0.36 | 0.44 | 0.40 |
| Relative RE Cost | 0.282 | 0.189 | 0.096 | 0.002 | 0.003 |

TABLE 12-continued

| Example Number | 62 | 63 | 64 | 65 | 66 |
|---|---|---|---|---|---|
| $CeO_2$ | 1.13 | 0.75 | 0.38 | — | — |
| CaO | — | — | — | — | — |
| SrO | 0.16 | 0.31 | 0.47 | 0.62 | 0.42 |
| Length Change after Firing (%) | — | — | — | — | — |
| CTE, 25-800° C. ($10^{-7}$/° C.) | — | — | — | — | — |
| CTE, 25-1000° C. ($10^{-7}$/° C.) | 17 | 14 | 18 | 23 | 22 |
| % Porosity | 50 | 51 | 51 | 50 | 51 |
| $d_{50}$ (microns) | 13 | 14 | 14 | 14 | 14 |
| $(d_{50}-d_{10})/d_{50}$ | 0.23 | 0.22 | 0.24 | 0.25 | 0.25 |
| $(d_{90}-d_{10})/d_{50}$ | — | — | — | — | — |
| Relative RE Cost | 0.282 | 0.190 | 0.097 | 0.004 | 0.003 |

TABLE 13

| | Example Number | | | | | | | |
|---|---|---|---|---|---|---|---|---|
| | 41 | 42 | 43 | 44 | 45 | 46 | 47 | 48 |
| Alumina D (18) | 44.18 | — | 44.18 | 44.18 | 44.18 | — | — | — |
| Alumina E (20) | — | — | — | — | — | 44.18 | 44.18 | 44.18 |
| Alumina C (10) | — | 44.18 | — | — | — | — | — | — |
| Silica C (25) | 2.71 | 2.17 | 2.71 | 2.71 | 2.71 | 2.71 | 2.71 | 2.71 |
| Titania A (0.5) | 33.52 | 33.52 | 33.52 | 33.52 | 33.52 | 33.52 | 33.52 | 33.52 |
| Talc B (14.4) | 19.10 | 19.10 | 19.10 | 19.10 | 19.10 | 19.10 | 19.10 | 19.10 |
| $Y_2O_3$ | 0.49 | 0.74 | 0.49 | 0.49 | 0.49 | 0.49 | 0.49 | 0.49 |
| $CeO_2$ | — | — | — | — | — | — | — | — |
| $La_2O_3$ | — | — | — | — | — | — | — | — |
| Graphite A (35) | 14 | 8 | 14 | 10 | 14 | 8 | 8 | 8 |
| Potato Starch (49) | 30 | 19 | 32 | 30 | 32 | 27 | 27 | 27 |
| First Soak Temperature (° C.) | 1351 | 1358 | 1349 | 1345 | 1351 | 1358 | 1355 | 1365 |
| First Soak Time (hours) | 16 | 16 | 16 | 16 | 16 | 16 | 16 | 16 |
| Length Change after Firing (%) | −0.28 | −1.11 | −1.33 | −1.55 | −1.89 | −2.02 | −2.5 | −2.71 |
| CTE, 25-800° C. ($10^{-7}$/° C.) | 12.9 | 8.1 | 11.7 | 9.6 | 13.25 | 10.8 | 9.7 | 11.7 |
| CTE, 25-1000° C. ($10^{-7}$/° C.) | 16.1 | 11.3 | 14.9 | 13.2 | 16.3 | 13.9 | 14.1 | 14.4 |
| % Porosity | 63.3 | 55.41 | 63.5 | 59.85 | 61.65 | 57.18 | 56 | 57.64 |
| $d_{50}$ (microns) | 16.24 | 13.14 | 17.6 | 17.15 | 17.16 | 19.63 | 18.93 | 17.81 |
| $(d_{50} - d_{10})/d_{50}$ | 0.21 | 0.22 | 0.35 | 0.41 | 0.63 | 0.24 | 0.23 | 0.16 |
| $(d_{90} - d_{10})/d_{50}$ | 0.53 | 0.44 | 0.82 | 0.78 | 0.76 | 0.70 | 0.54 | 0.39 |

| | Example Number | | | | | | | |
|---|---|---|---|---|---|---|---|---|
| | 49 | 50 | 51 | 52 | 53 | 54 | 55 | 56 |
| Alumina D (18) | 44.18 | 44.18 | 44.18 | 44.05 | 43.97 | 43.97 | 43.97 | 44.18 |
| Alumina E (20) | — | — | — | — | — | — | — | — |
| Alumina C (10) | — | — | — | — | — | — | — | — |
| Silica C (25) | 2.71 | 2.71 | 2.71 | 2.7 | 2.70 | 2.70 | 2.70 | 2.71 |
| Titania A (0.5) | 33.52 | 33.52 | 33.49 | 33.42 | 33.36 | 33.36 | 33.36 | 33.52 |
| Talc B (14.4) | 19.10 | 19.10 | 19.08 | 19.05 | 19.01 | 19.01 | 19.01 | 19.10 |
| $Y_2O_3$ | 0.49 | — | — | — | — | — | — | — |
| $CeO_2$ | — | 0.96 | 0.59 | 0.78 | 0.975 | 0.98 | 0.98 | — |
| $La_2O_3$ | — | — | — | — | — | — | — | 0.96 |
| Graphite A (35) | 10 | 14 | 10 | 10 | 10 | 10 | 10 | 14 |
| Potato Starch (49) | 30 | 32 | 30 | 30 | 30 | 30 | 30 | 32 |
| First Soak Temperature (° C.) | 1355 | 1351 | 1345 | 1345 | 1345 | 1345 | 1345 | 1346 |
| First Soak Time (hours) | 16 | 16 | 16 | 16 | 16 | 16 | 16 | 16 |
| Length Change after Firing (%) | −2.72 | −1.31 | −1.39 | −1.5 | −1.51 | −1.81 | −2.19 | −1.77 |
| CTE, 25-800° C. ($10^{-7}$/° C.) | — | 11.7 | 12.1 | 11 | 11.6 | 10.4 | 10.7 | 14.7 |
| CTE, 25-1000° C. ($10^{-7}$/° C.) | — | 15 | 15.9 | 14.6 | 15.2 | 14 | 14.2 | 17.9 |

TABLE 13-continued

| | | | | | | | | |
|---|---|---|---|---|---|---|---|---|
| % Porosity | — | 63.06 | 59.58 | 59.52 | 61 | 59.73 | 59.24 | — |
| $d_{50}$ (microns) | — | 18.9 | 17.12 | 17.45 | 15.91 | 17.66 | 17.8 | — |
| $(d_{50} - d_{10})/d_{50}$ | — | 0.28 | 0.35 | 0.36 | 0.18 | 0.32 | 0.33 | — |
| $(d_{90} - d_{10})/d_{50}$ | — | 0.71 | 0.70 | 0.70 | 0.41 | 0.68 | 0.65 | — |

TABLE 14

| Example Number | 69 | 70 | 71 | 72 |
|---|---|---|---|---|
| Alumina D (18) | 44.09 | 44.21 | 44.21 | 44.06 |
| Alumina E (20) | — | — | — | — |
| Alumina C (10) | — | — | — | — |
| Silica C (25) | 2.70 | 2.71 | 2.71 | 2.70 |
| Titania A (0.5) | 33.45 | 33.54 | 33.54 | 33.43 |
| Talc B (14.4) | 19.06 | 19.11 | 19.11 | 19.05 |
| $Y_2O_3$ | — | — | — | — |
| $CeO_2$ | — | — | — | 0.49 |
| $La_2O_3$ | — | — | — | — |
| Strontium Carbonate | 0.7 | — | — | 0.28 |
| Calcium Carbonate | — | 0.42 | 0.421 | — |
| Graphite A (35) | 10 | 10 | 10 | 10 |
| Potato Starch (49) | 30 | 30 | 30 | 30 |
| First Soak Temperature (° C.) | 1345 | 1345 | 1351 | 1345 |
| First Soak Time (hours) | 16 | 16 | 16 | 16 |
| Length Change after Firing (%) | −1.33 | −1.33 | −1.54 | −1.73 |
| CTE, 25-800° C. ($10^{-7}$/° C.) | 18 | 15.7 | 16 | 14.1 |
| CTE, 25-1000° C. ($10^{-7}$/° C.) | 21.5 | 19.1 | 19 | 17.8 |
| % Porosity | 58.67 | 58.11 | 61.03 | 59.00 |
| $d_{50}$ (microns) | 16.37 | 15.29 | 18.17 | 16.95 |
| $(d_{50}-d_{10})/d_{50}$ | 0.32 | 0.39 | 0.33 | 0.31 |
| $(d_{90}-d_{10})/d_{50}$ | 0.71 | 0.75 | 0.82 | 0.68 |

TABLE 15

| | Porosity (%) | | $d_{50}$ (microns) | | CTE 800 | | CTE 1000 | |
|---|---|---|---|---|---|---|---|---|
| | Example Number | | | | | | | |
| | 33 | | 33 | | 33 | | 33 | |
| | 40 | 1% | 40 | 1% | 40 | 1% | 40 | 1% |
| Temperature | None | $CeO_2$ | None | $CeO_2$ | None | $CeO_2$ | None | $CeO_2$ |
| 1310 | 51 | 51 | 9 | 11 | 23.0 | 11.5 | 26 | 15 |
| 1320 | 52 | 52 | 9 | 12 | 21.4 | 11.2 | 25 | 15 |
| 1330 | 53 | 51 | 10 | 12 | 20.9 | 10.5 | 24 | 14 |
| 1340 | 54 | 51 | 10 | 12 | 18.7 | 10.5 | 22 | 14 |
| 1350 | 53 | 51 | 11 | 13 | 17.4 | 9.9 | 21 | 13 |
| 1360 | 54 | — | 11 | — | 15.1 | 6.9 | 18 | — |
| 1370 | 52 | — | 13 | — | 12.6 | — | 16 | — |

| | dbreadth | | dfactor | | Firing Length Change | |
|---|---|---|---|---|---|---|
| | Example Number | | | | | |
| | 33 | | 33 | | 33 | |
| | 40 | 1% | 40 | 1% | 40 | 1% |
| Temperature | None | $CeO_2$ | None | $CeO_2$ | None | $CeO_2$ |
| 1310 | 0.66 | 0.39 | 0.49 | 0.29 | −0.2 | −0.2 |
| 1320 | 0.69 | 0.42 | 0.47 | 0.29 | 0.3 | 0.0 |
| 1330 | 0.65 | 0.38 | 0.48 | 0.26 | 0.9 | −0.1 |
| 1340 | 0.61 | 0.37 | 0.44 | 0.25 | 1.4 | −0.1 |
| 1350 | 0.56 | 0.32 | 0.39 | 0.21 | 1.5 | −0.3 |
| 1360 | 0.48 | 0.38 | 0.32 | — | 1.4 | — |
| 1370 | 0.39 | — | 0.26 | — | 0.5 | — |

TABLE 16

| | Example Number | | | | | | | |
|---|---|---|---|---|---|---|---|---|
| | 60 | 61 | 65 | 66 | 60 | 61 | 65 | 66 |
| Temperature (° C.) | 0.23% CaO | 0.34% CaO | 0.62% SrO | 0.42% SrO | 0.23% CaO | 0.34% CaO | 0.62% SrO | 0.42% SrO |
| | Porosity (%) | | | | $d_{50}$ (microns) | | | |
| 1310 | 52 | 52 | 51 | 52 | 11 | 12 | 11 | 11 |
| 1320 | 53 | 52 | 52 | 53 | 11 | 12 | 12 | 11 |
| 1330 | 53 | 52 | 52 | 53 | 12 | 12 | 12 | 12 |
| 1340 | 52 | 52 | 51 | 53 | 12 | 13 | 13 | 12 |
| 1350 | 51 | 52 | 51 | 51 | 13 | 14 | 14 | 13 |
| | CTE 800 | | | | CTE 1000 | | | |
| 1310 | 19.4 | 17.9 | 22.5 | 21.5 | 23 | 21 | 26 | 25 |
| 1320 | 18.7 | 16.3 | 19.3 | 21.1 | 22 | 19 | 23 | 25 |
| 1330 | 17.6 | 15.8 | 17.1 | 19.5 | 21 | 19 | 21 | 23 |
| 1340 | 16.0 | 14.6 | 16.7 | 17.6 | 19 | 18 | 20 | 21 |
| 1350 | 14.3 | 13.7 | 14.9 | 16.4 | 18 | 17 | 18 | 20 |
| 1360 | 7.1 | 5.3 | 6.6 | 9.0 | — | — | — | — |
| | dbreadth | | | | dfactor | | | |
| 1310 | 0.60 | 0.46 | 0.43 | 0.48 | 0.43 | 0.29 | 0.28 | 0.31 |
| 1320 | 0.52 | 0.44 | 0.42 | 0.48 | 0.32 | 0.26 | 0.23 | 0.30 |
| 1330 | 0.46 | 0.53 | 0.42 | 0.48 | 0.31 | 0.35 | 0.23 | 0.33 |
| 1340 | 0.49 | 0.39 | 0.38 | 0.37 | 0.33 | 0.23 | 0.21 | 0.23 |
| 1350 | 0.40 | 0.62 | 0.37 | 0.41 | 0.24 | 0.26 | 0.21 | 0.29 |
| 1360 | 0.49 | 0.49 | 0.40 | 0.44 | — | — | — | — |

TABLE 16-continued

|  | Firing Length Change Example Number | | | |
|---|---|---|---|---|
| Temperature (° C.) | 60 0.23% CaO | 61 0.34% CaO | 65 0.62% SrO | 66 0.42% SrO |
| 1310 | 0.6 | 0.3 | −0.3 | 0.0 |
| 1320 | 1.2 | 0.4 | 0.2 | 0.6 |
| 1330 | 0.9 | 0.4 | 0.3 | 0.5 |
| 1340 | 0.9 | 0.4 | 0.2 | 0.7 |
| 1350 | 0.7 | −0.1 | −0.1 | 0.6 |

TABLE 17

| Example | 33 | 61 | 65 |
|---|---|---|---|
| Additive | 1% $CeO_2$ | 0.34% CaO | 0.62% SrO |
| Hold 1300° C. —8 hrs during cooling | 0.3 | −0.2 | 0.1 |
| Hold 1275° C. —8 hrs during cooling | −0.2 | 0.2 | −1.7 |
| Hold 1250° C. —8 hrs during cooling | −0.6 | −0.3 | −0.9 |
| Reheat to 1300° C. —8 hours after firing | −0.7 | −3.1 | −3.4 |
| Reheat to 1275° C. —8 hours after firing | −0.5 | −2.5 | −4.6 |
| Reheat to 1250° C. —8 hours after firing | −0.4 | −3.5 | −4.4 |

TABLE 18

| Low Temperature | Time at Low Temperature (hr) | Mid Temperature (hr) | Time at Mid Temperature (hr) | CTE 1000° C. Example 33 | CTE 1000° C. Example 61 |
|---|---|---|---|---|---|
| RT | >24 | None | — | 14.1 | 16.9 |
| RT | >24 | 1250 | 2 | 14.3 | 12.2 |
| RT | >24 | 1250 | 8 | 13.6 | 11.9 |
| RT | >24 | 1250 | 16 | 13.5 | 11.0 |
| RT | >24 | 1200 | 8 | 13.3 | 12.6 |
| RT | >24 | 1000 | 8 | 15.3 | 17.6 |
| 400° C. | 2 | 1250 | 8 | 13.2 | 13.8 |
| 800° C. | 2 | 1250 | 8 | 13.8 | 14.0 |
| 1000° C. | 2 | 1250 | 8 | 13.8 | 14.4 |
| 400° C. | 16 | 1250 | 8 | 14.1 | 14.5 |
| 800° C. | 16 | 1250 | 8 | 13.4 | 14.6 |
| 1000° C. | 16 | 1250 | 8 | 14.3 | 13.1 |

TABLE 19

| Example | CaO | $CeO_2$ | Porosity | CTE 1000° C. | $d_{50}$ | $d_f$ | CTE 1000° C. after reheating to 1250° C./hrs |
|---|---|---|---|---|---|---|---|
| 34 | 0.00 | 1.5 | 50.5 | 13.8 | 12.7 | 0.27 | 12.7 |
| 60 | 0.23 | 0.0 | 52.7 | 21.4 | 12.0 | 0.31 | 17.1 |
| 61 | 0.34 | 0.0 | 51.6 | 18.2 | 12.2 | 0.23 | 12.8 |
| 67 | 0.51 | 0.0 | 50.6 | 16.1 | 13.1 | 0.22 | 12.5 |
| 68 | 0.68 | 0.0 | 49.7 | 15.7 | 13.9 | 0.25 | 12.4 |

TABLE 20

| Example Number | Pseudobrookite | Corundum | Cordierite | Mullite | $Y_2Ti_2O_7$ | $CeO_2$ | $Al_{2(1-x)}Mg_xTi_{(1+x)}O_5$ Value of x |
|---|---|---|---|---|---|---|---|
| 25 | 65 | 3 | 16 | 16 | 0.4 | 0.0 | 0.19 |
| 26 | 65 | 1 | 13 | 20 | 1.3 | 0.0 | 0.19 |
| 29 | 67 | 1 | 14 | 18 | 0.0 | 0.0 | 0.19 |
| 30 | 67 | 1 | 10 | 20 | 0.0 | 1.5 | 0.19 |

The invention claimed is:

1. A ceramic article, comprising:
a pseudobrookite phase comprising predominately alumina, magnesia, and titania;
a second phase comprising cordierite; and
a sintering aid, comprising:
(i) at least one of a calcium oxide and strontium oxide, and
(ii) at least one of a yttrium oxide, a lanthanum oxide, and a cerium oxide;
wherein the ceramic article comprises a total porosity of at least 40% by volume, a median pore size $d_{50}$ in a range of 10 μm to 30 μm, and a composition expressed on an oxide basis of $a(Al_2TiO_5)+b(MgTi_2O_5)+c(2MgO.2Al_2O_3.5SiO_2)+d(3Al_2O_3.2SiO_2)+e(MgO.Al_2O_3)+f(2MgO.TiO_2)+g(CaO)+h(SrO)+i(X)+j(Fe_2O_3.TiO_2)+k(TiO_2)+l(Al_2O_3)$, wherein X is at least one of $CeO_2$, $Y_2O_3$, and $La_2O_3$, and a, b, c, d, e, f, g, h, i, j, k, and l are weight fractions of each component such that $(a+b+c+d+e+f+g+h+i+j+k+l)=1.00$, and wherein $0.3 \leq a \leq 0.75$, $0.075 \leq b \leq 0.3$, $0.02 \leq c \leq 0.5$, $0.0 \leq d \leq 0.4$, $0.0 \leq e \leq 0.25$, $0.0 \leq f \leq 0.1$, $0.0 \leq g \leq 0.01$, $0.0 \leq h \leq 0.02$, $0.0015 \leq (g+h)$, $0.0 \leq i \leq 0.05$, $0.0 \leq j \leq 0.03$, $0.0 k \leq 0.2$, and $0.0 \leq l \leq 0.1$.

2. The ceramic article of claim 1, wherein the sintering aid comprises a cerium oxide.

3. The ceramic article of claim 1, wherein the sintering aid comprises cerium oxide and at least one of yttrium oxide and a lanthanum oxide.

4. The ceramic article of claim 1, wherein the ceramic article has a composition comprising, as expressed in weight percent on an oxide basis, from 4 to 10% MgO; from 40 to 55% $Al_2O_3$; from 25 to 44% $TiO_2$; and from 5 to 25% $SiO_2$.

* * * * *

UNITED STATES PATENT AND TRADEMARK OFFICE
CERTIFICATE OF CORRECTION

PATENT NO. : 10,526,249 B2
APPLICATION NO. : 14/722560
DATED : January 7, 2020
INVENTOR(S) : Adriane Marie Divens-Dutcher et al.

Page 1 of 1

It is certified that error appears in the above-identified patent and that said Letters Patent is hereby corrected as shown below:

In the Claims

In Column 28, Lines 66-67, Claim 1, delete "0.0 k 0.2," and insert -- $0.0 \leq k \leq 0.2$, --, therefor.

Signed and Sealed this
Seventeenth Day of March, 2020

Andrei Iancu
*Director of the United States Patent and Trademark Office*